United States Patent
Inoue et al.

(10) Patent No.: US 10,667,316 B1
(45) Date of Patent: May 26, 2020

(54) WIRELESS COMMUNICATION DEVICE HAVING PLURAL PROTOCOLS AND PEDALING SENSING DEVICE

(71) Applicant: SHIMANO INC., Sakai (JP)

(72) Inventors: Shota Inoue, Sakai (JP); Yoshiyuki Kasai, Sakai (JP); Makoto Usui, Sakai (JP); Masako Itsukashi, Sakai (JP); Akihiro Nozaki, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/198,780

(22) Filed: Nov. 22, 2018

(51) Int. Cl.
*H04W 76/15* (2018.01)
*H04L 29/06* (2006.01)

(52) U.S. Cl.
CPC ............. *H04W 76/15* (2018.02); *H04L 69/18* (2013.01)

(58) Field of Classification Search
CPC .......... H04W 76/15; H04W 4/48; H04L 69/18
See application file for complete search history.

(56) References Cited

U.S. PATENT DOCUMENTS

| | | | |
|---|---|---|---|
| 8,909,424 B2 | 12/2014 | Jordan et al. | |
| 8,971,795 B2* | 3/2015 | Watanabe | H04L 41/22 455/11.1 |
| 9,737,761 B1* | 8/2017 | Sivaraj | A61B 5/7275 |
| 2003/0021272 A1* | 1/2003 | Celebioglu | H04L 69/22 370/392 |
| 2008/0042811 A1* | 2/2008 | Le Gars | B62H 3/00 340/432 |
| 2008/0200308 A1* | 8/2008 | Pedrini | A61B 5/0205 482/6 |
| 2009/0063049 A1* | 3/2009 | Swisher | A63B 24/0062 701/469 |
| 2010/0120585 A1* | 5/2010 | Quy | A61B 5/6826 482/8 |
| 2010/0198453 A1* | 8/2010 | Dorogusker | A63B 24/0062 701/31.4 |
| 2011/0003585 A1* | 1/2011 | Wang | H04M 1/72583 455/418 |
| 2011/0118084 A1* | 5/2011 | Tsai | A63B 24/0087 482/2 |
| 2012/0188083 A1* | 7/2012 | Miller, II | A42B 3/046 340/573.1 |
| 2012/0220322 A1* | 8/2012 | Klassen | H04W 36/14 455/466 |
| 2014/0073307 A1* | 3/2014 | Zhang | H04W 80/00 455/418 |
| 2014/0102237 A1* | 4/2014 | Jordan | B62J 99/00 74/473.12 |
| 2014/0173443 A1* | 6/2014 | Hawkins | G06F 9/452 715/733 |
| 2014/0273858 A1* | 9/2014 | Panther | A61B 5/0002 455/41.2 |

(Continued)

*Primary Examiner* — Devan A Sandiford
(74) *Attorney, Agent, or Firm* — Mori & Ward, LLP

(57) ABSTRACT

A wireless communication device for a human-powered vehicle comprises a wireless communicator and a controller. The wireless communicator has a first communication mode in which at least a first communication protocol is used and a second communication mode in which a second communication protocol different from the first communication protocol is used. The controller is configured to set the wireless communicator with one of the first communication mode and the second communication mode.

15 Claims, 18 Drawing Sheets

(56) References Cited

U.S. PATENT DOCUMENTS

| | | | |
|---|---|---|---|
| 2015/0156089 A1* | 6/2015 | McCleland | H04L 43/08 307/1 |
| 2016/0100280 A1* | 4/2016 | Wright | H04W 88/026 455/41.2 |
| 2016/0127883 A1* | 5/2016 | Zhou | H04W 8/005 455/41.1 |
| 2019/0241236 A1* | 8/2019 | Lin | B62M 9/132 |

* cited by examiner

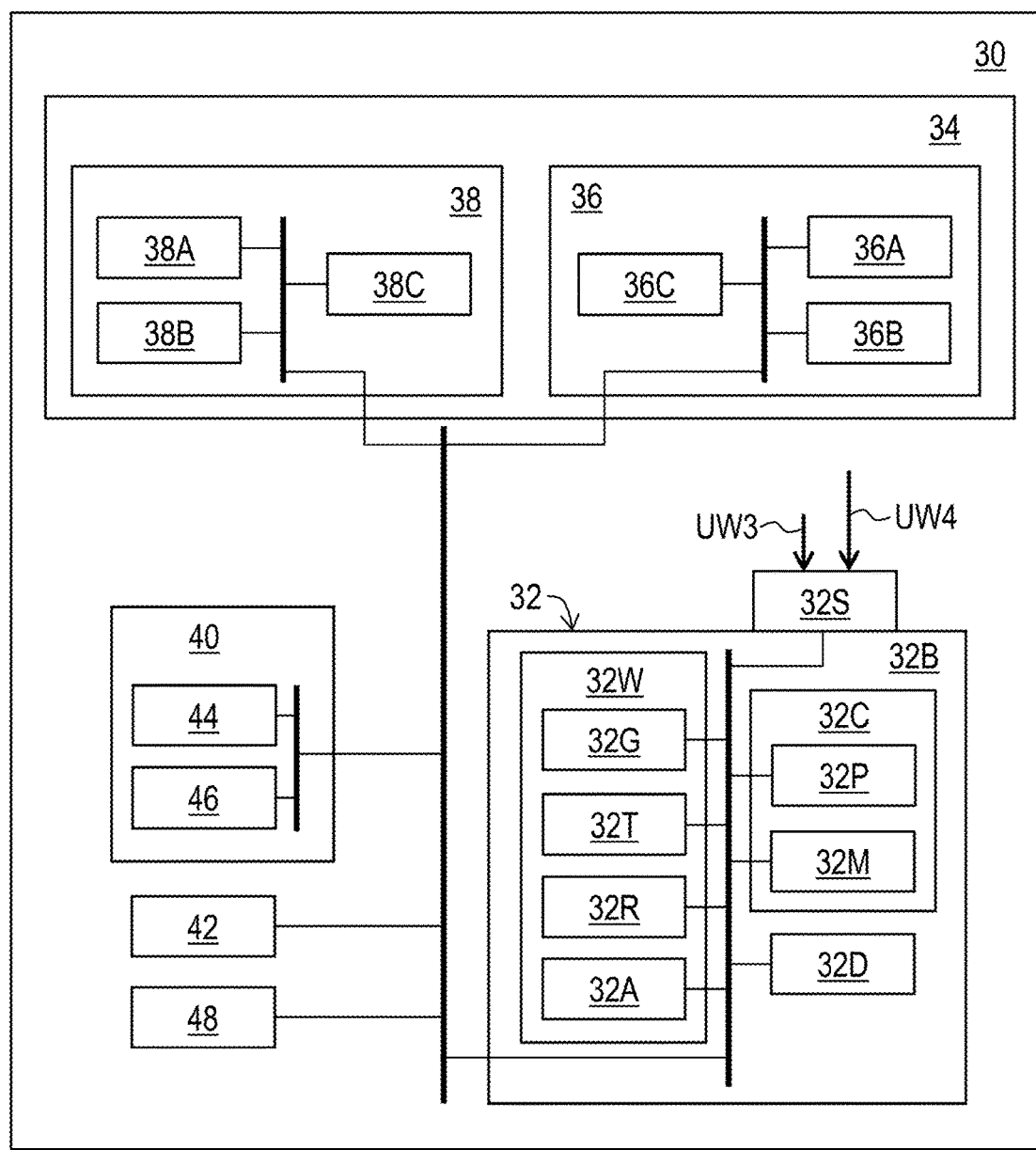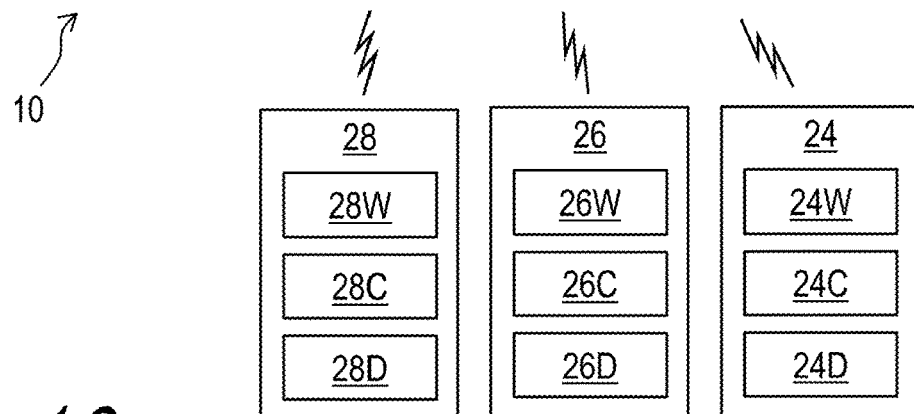
FIG. 16

WIRELESS COMMUNICATION DEVICE HAVING PLURAL PROTOCOLS AND PEDALING SENSING DEVICE

BACKGROUND OF THE INVENTION

Field of the Invention

The present invention relates to a wireless communication device and a pedaling sensing device.

Discussion of the Background

A human-powered vehicle includes a wireless communication system configured to operate a wireless component.

SUMMARY OF THE INVENTION

In accordance with a first aspect of the present invention, a wireless communication device for a human-powered vehicle comprises a wireless communicator and a controller. The wireless communicator has a first communication mode in which at least a first communication protocol is used and a second communication mode in which a second communication protocol different from the first communication protocol is used. The controller is configured to set the wireless communicator with one of the first communication mode and the second communication mode.

With the wireless communication device according to the first aspect, it is possible to set the wireless communicator with one of the first communication mode in which the first communication protocol is used and the second communication mode in which the second communication protocol is used. This can improve convenience of the wireless communication device.

In accordance with a second aspect of the present invention, the wireless communication device according to the first aspect is configured so that the controller is configured to change a mode of the wireless communicator from one of the first communication mode and the second communication mode to the other of the first communication mode and the second communication mode.

With the wireless communication device according to the second aspect, it is possible to effectively improve convenience of the wireless communication device.

In accordance with a third aspect of the present invention, the wireless communication device according to the first or second aspect is configured so that the wireless communicator is configured to use each of the first communication protocol and the second communication protocol in the first communication mode.

With the wireless communication device according to the third aspect, it is possible to effectively improve convenience of the wireless communication device in the first communication mode.

In accordance with a fourth aspect of the present invention, the wireless communication device according to any one of the first to third aspects is configured so that the wireless communicator has a third communication mode in which only the first communication protocol among the first communication protocol and the second communication protocol is used.

With the wireless communication device according to the fourth aspect, it is possible to use the third communication mode for a device configured to use only the first communication protocol.

In accordance with a fifth aspect of the present invention, the wireless communication device according to the fourth aspect is configured so that the controller is configured to change the mode of the wireless communicator from one of the first communication mode, the second communication mode, and the third communication mode to another of the first communication mode, the second communication mode, and the third communication mode.

With the wireless communication device according to the fifth aspect, it is possible to effectively use the first to third communication modes.

In accordance with a sixth aspect of the present invention, the wireless communication device according to the fourth or fifth aspect is configured so that the controller is configured to change the mode of the wireless communicator among the first communication mode, the second communication mode, and the third communication mode in a predetermined order.

With the wireless communication device according to the sixth aspect, it is possible to effectively improve convenience of the wireless communication device.

In accordance with a seventh aspect of the present invention, the wireless communication device according to any one of the first to sixth aspects is configured so that the controller is configured to set the wireless communicator with one of the first communication mode and the second communication mode based on a user input.

With the wireless communication device according to the seventh aspect, it is possible to change the mode of the wireless communicator using the user input.

In accordance with an eighth aspect of the present invention, the wireless communication device according to the seventh aspect further comprises a mode switch configured to receive the user input.

With the wireless communication device according to the eighth aspect, it is possible to reliably receive the user input using the mode switch.

In accordance with a ninth aspect of the present invention, the wireless communication device according to any one of the first to third aspects is configured so that the controller includes a memory configured to store mode information indicating a selected communication mode. The controller is configured to set the wireless communicator with the selected communication mode based on the mode information. The selected communication mode includes one of the first communication mode and the second communication mode.

With the wireless communication device according to the ninth aspect, it is possible to set the mode of the wireless communicator using the mode information stored in the memory of the controller.

In accordance with a tenth aspect of the present invention, the wireless communication device according to the ninth aspect is configured so that the controller is configured to receive a mode command indicating the selected communication mode from an input device. The controller is configured to store the mode command as the mode information in the memory if the controller receives the mode command.

With the wireless communication device according to the tenth aspect, it is possible to set the mode of the wireless communicator using the mode command transmitted from the input device.

In accordance with an eleventh aspect of the present invention, the wireless communication device according to any one of the first to tenth aspects further comprises an indicator configured to indicate the first communication mode and the second communication mode.

With the wireless communication device according to the eleventh aspect, it is possible to inform the user of the mode of the wireless communicator.

In accordance with a twelfth aspect of the present invention, the wireless communication device according to the eleventh aspect is configured so that the controller is configured to control the indicator to indicate the first communication mode in a first manner if the wireless communicator is in the first communication mode. The controller is configured to control the indicator to indicate the second communication mode in a second manner if the wireless communicator is in the second communication mode.

With the wireless communication device according to the twelfth aspect, it is possible to reliably inform the user of the mode of the wireless communicator.

In accordance with a thirteenth aspect of the present invention, the wireless communication device according to any one of the first to twelfth aspects is configured so that the wireless communicator has an awake state in which the wireless communicator is configured to wirelessly transmit the communication signal and a sleep state in which the wireless communicator is configured to stop transmitting the communication signal.

With the wireless communication device according to the thirteenth aspect, it is possible to save electricity using the sleep mode.

In accordance with a fourteenth aspect of the present invention, a wireless communication device for a human-powered vehicle comprises a wireless communicator and a controller. The wireless communicator has an awake state and a sleep state. In the awake state, the wireless communicator is configured to wirelessly transmit a communication signal by selectively using at least one of a first communication protocol and a second communication protocol different from the first communication protocol. In the sleep state, the wireless communicator is configured to stop transmitting the communication signal. The controller is configured to set the wireless communicator with one of the awake state and the sleep state.

With the wireless communication device according to the fourteenth aspect, it is possible to save electricity using the sleep mode.

In accordance with a fifteenth aspect of the present invention, a pedaling sensing device for a human-powered vehicle comprises a pedaling sensor configured to sense a state of pedaling and the wireless communication device according to any one of the first to fourteenth aspects. The wireless communication device is configured to wirelessly transmit a pedaling signal indicating the state of the pedaling.

With the wireless communication device according to the fifteenth aspect, it is possible to set the wireless communicator of the pedaling sensing device with one of the first communication mode in which the first communication protocol is used and the second communication mode in which the second communication protocol is used. This can improve convenience of the pedaling sensing device.

In accordance with a sixteenth aspect of the present invention, a wireless communication device for a human-powered vehicle comprises a wireless communicator and a controller. The wireless communicator is configured to wirelessly transmit a connection demand signal to establish a wireless connection between the wireless communicator and an additional wireless communicator. The controller is configured to control the wireless communicator to wirelessly transmit the connection demand signal at first frequency for a first period. The controller is configured to control the wireless communicator to wirelessly transmit the connection demand signal at second frequency which is different from the first frequency after a passage of the first period.

With the wireless communication device according to the sixteenth aspect, it is possible to improve flexibility of a pattern of the connection demand signal. This can improve convenience of the wireless communication device.

In accordance with a seventeenth aspect of the present invention, the wireless communication device according to the sixteenth aspect is configured so that the second frequency is lower than the first frequency.

With the wireless communication device according to the seventeenth aspect, it is possible to save electricity by making the second frequency lower than the first frequency.

In accordance with an eighteenth aspect of the present invention, the wireless communication device according to the sixteenth or seventeenth aspect is configured so that the controller is configured to control the wireless communicator to wirelessly transmit the connection demand signal at the second frequency for a second period after the passage of the first period, the second period is different from the first period.

With the wireless communication device according to the eighteenth aspect, it is possible to efficiently improve flexibility of a pattern of the connection demand signal. This can further improve convenience of the wireless communication device.

In accordance with a nineteenth aspect of the present invention, the wireless communication device according to the eighteenth aspect is configured so that the second period is longer than the first period.

With the wireless communication device according to the nineteenth aspect, it is possible to efficiently save electricity by making the second period shorter than the first period.

In accordance with a twentieth aspect of the present invention, the wireless communication device according to the eighteenth or nineteenth aspect is configured so that the controller is configured to control the wireless communicator to stop transmitting the connection demand signal after a passage of the second period.

With the wireless communication device according to the twentieth aspect, it is possible to efficiently save electricity.

In accordance with a twenty-first aspect of the present invention, the wireless communication device according to any one of the sixteenth to twentieth aspects is configured so that the controller is configured to control the wireless communicator to wirelessly transmit the connection demand signal at first intervals for the first period. The controller is configured to control the wireless communicator to wirelessly transmit the connection demand signal at second intervals which is different from the first intervals after a passage of the first period.

With the wireless communication device according to the twenty-first aspect, it is possible to improve flexibility of a pattern of the connection demand signal. This can improve convenience of the wireless communication device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 16 is a schematic block diagram of a pedaling sensing device of the operating system illustrated in FIG. 5.

DESCRIPTION OF THE EMBODIMENTS

Figure 1:
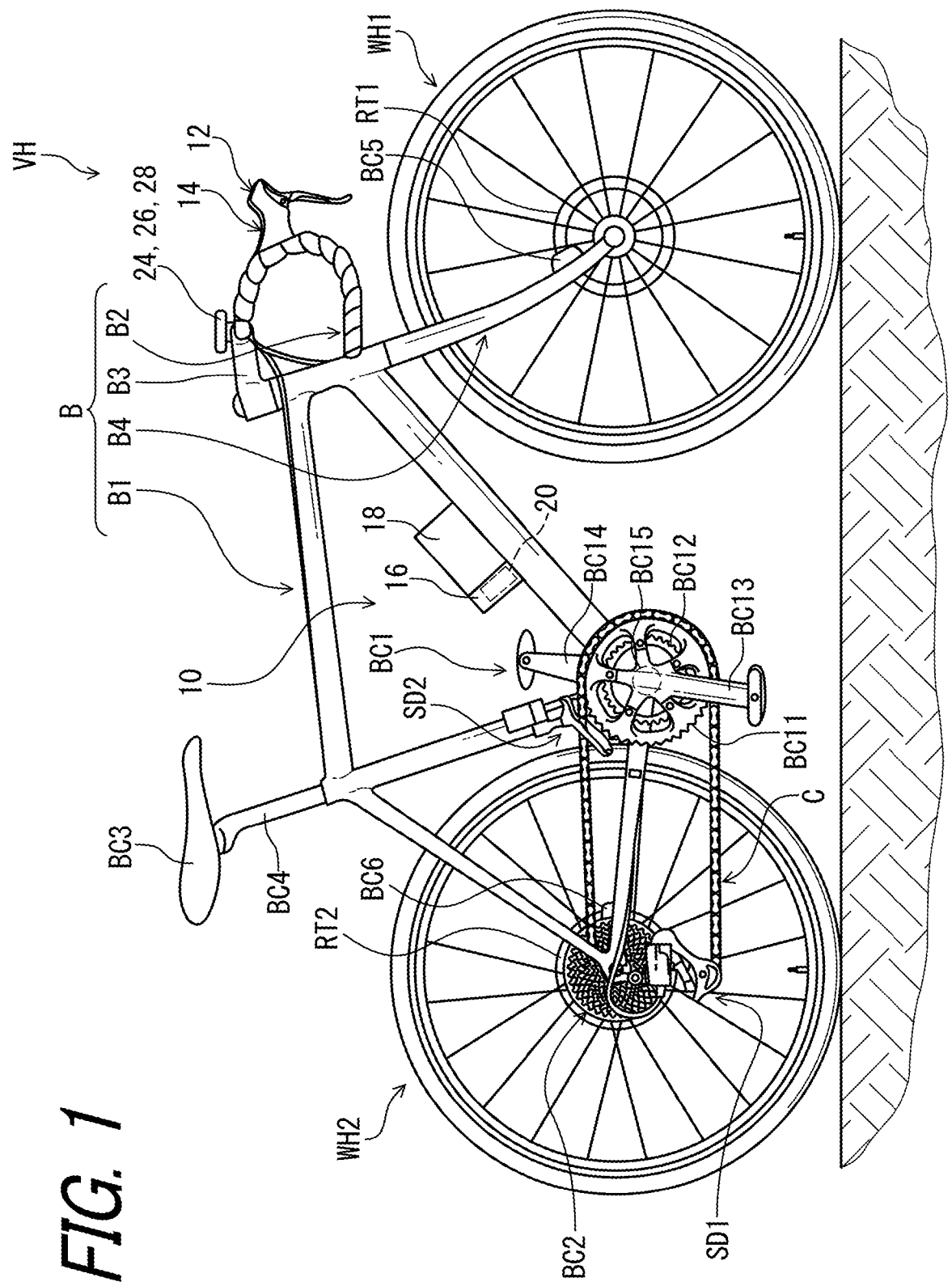
FIG. 1 is a side elevational view of a human-powered vehicle provided with an operating system including a wireless communication device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an operating system 10. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. For example, the human-powered vehicle VH can have a larger size than that of the four-wheeled automobile. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating system 10 can be applied to mountain bikes or any type of human-powered vehicles.

As seen in FIG. 1, the human-powered vehicle VH includes a vehicle body B, a crank BC1, a rear sprocket assembly BC2, a saddle BC3, a seatpost BC4, a front brake BC5, a rear brake BC6, a chain C, and wheels WH1 and WH2. The vehicle body B includes a vehicle frame B1, a handlebar B2, a stem B3, and a front fork B4. The stem B3 couples the handlebar B2 to the front fork B4 with the stem B3. An electronic device such as a cycle computer is attached to the stem B3. The crank BC1 includes sprocket wheels BC11 and BC12, crank arms BC13 and BC14, and a crank axle BC15. The crank arms BC13 and BC14 are secured to the crank axle BC15. The sprocket wheels BC11 and BC12 are secured to at least one of the crank arm BC13 and the crank axle BC15. The chain C engages with the rear sprocket assembly BC2 and the sprocket wheels BC11 and BC12 of the crank BC1. In this embodiment, the crank BC1 has two speed stages, and the rear sprocket assembly BC2 has eleven speed stages.

In this embodiment, the human-powered vehicle VH includes shift changing devices SD1 and SD2 configured to change speed stages. More specifically, the shift changing device SD1 includes a rear derailleur configured to shift the chain C between sprockets of the rear sprocket assembly BC2. The shift changing device SD2 includes a front derailleur configured to shift the chain C between the sprocket wheels BC11 and BC12 of the crank BC1.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle BC3 of the human-powered vehicle VH with facing the handlebar B2. Accordingly, these terms, as utilized to describe the operating system 10 or other components, should be interpreted relative to the human-powered vehicle VH equipped with the operating system 10 as used in an upright riding position on a horizontal surface.

Figure 2:
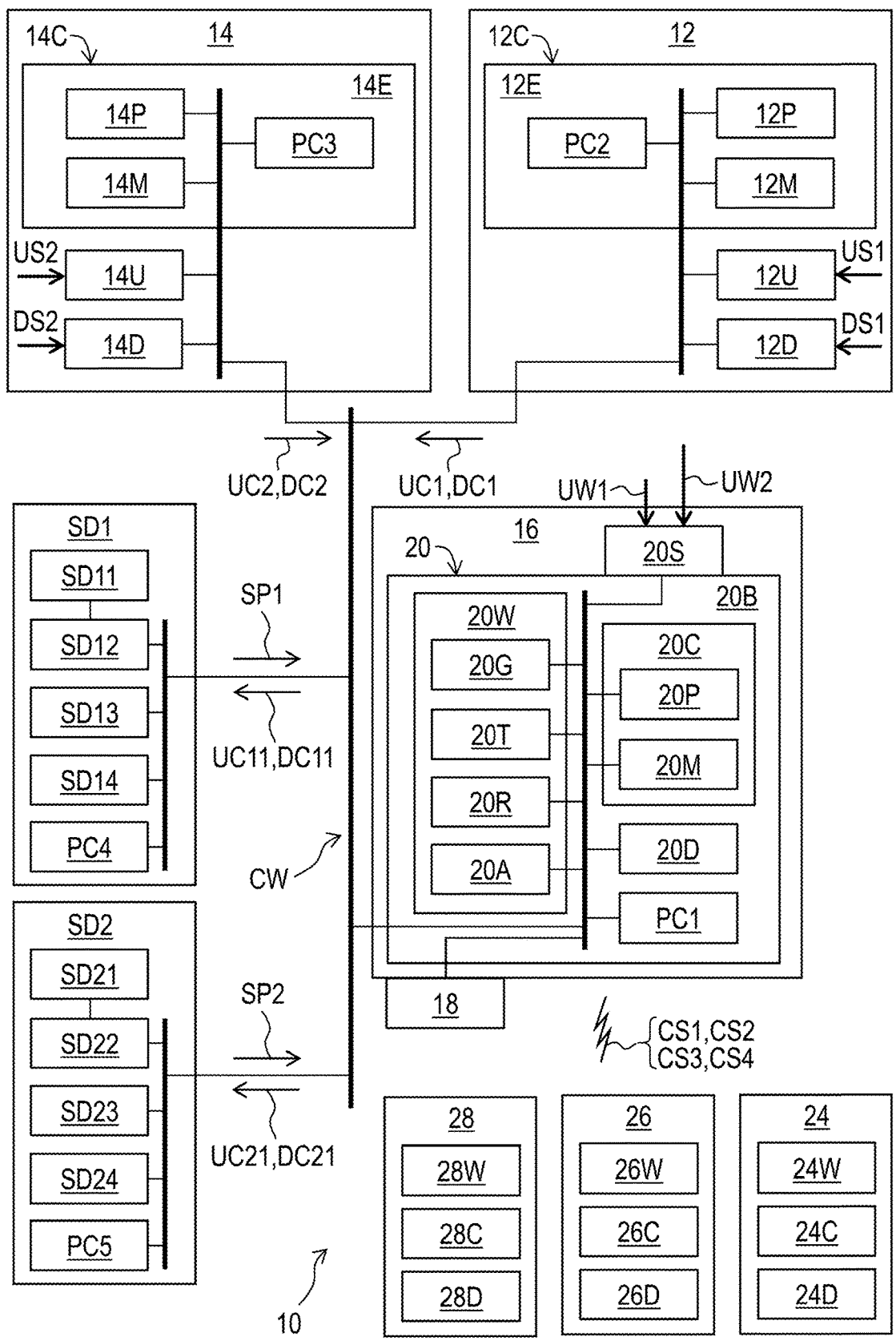
FIG. 2 is a schematic block diagram of the operating system of the human-powered vehicle illustrated in FIG. 1.

As seen in FIG. 2, the operating system 10 includes operating devices 12 and 14. The operating device 12 is configured to control the shift changing device SD1 to upshift or downshift in response to a user upshift input US1 or a user downshift input DS1. The operating device 14 is configured to control the shift changing device SD2 to upshift or downshift in response to a user upshift input US2 or a user downshift input DS2.

Figure 3:
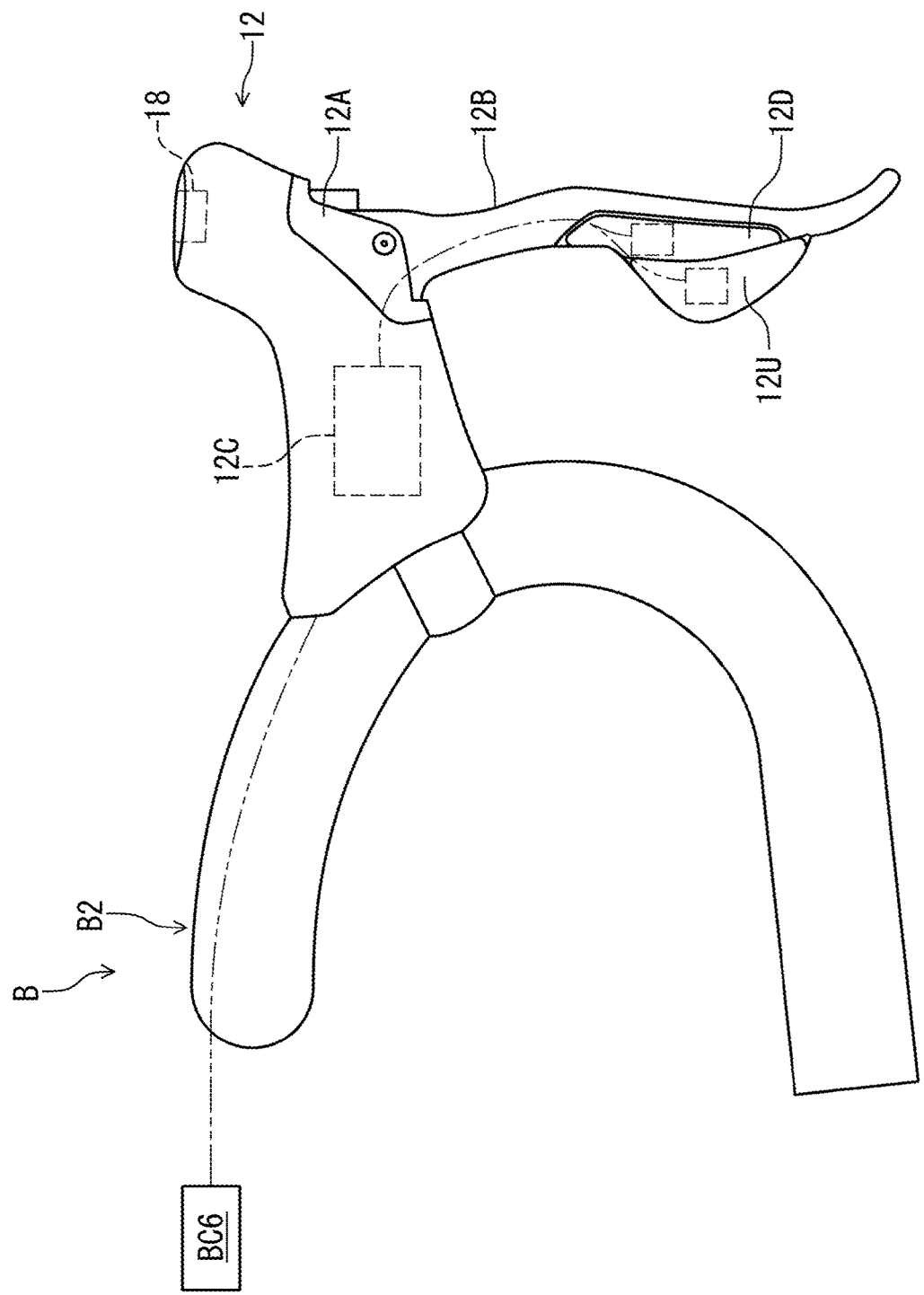
FIG. 3 is a side elevational view of an operating device of the operating system illustrated in FIG. 2.

As seen in FIG. 3, the operating device 12 includes an upshift switch 12U and a downshift switch 12D. The upshift switch 12U is configured to receive the user upshift input US1. The downshift switch 12D is configured to receive the user downshift input DS1. The operating device 12 includes a base member 12A and an operating member 12B. The base member 12A is configured to be mounted to the handlebar B2. The operating member 12B is pivotally coupled to the base member 12A. The upshift switch 12U and the downshift switch 12D are attached to the operating member 12B. The operating device 12 is operatively coupled to the rear brake BC6.

Figure 4:
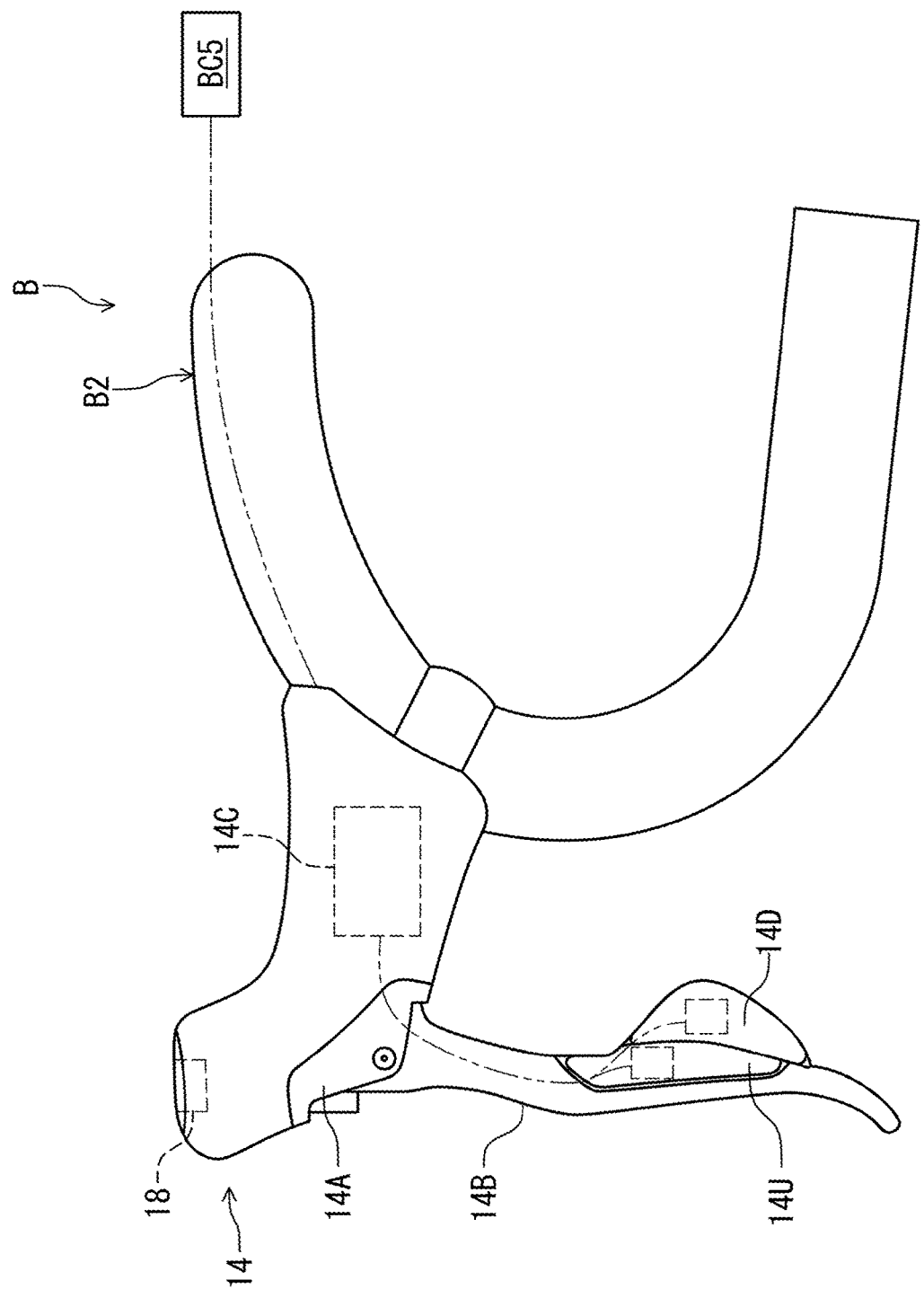
FIG. 4 is a side elevational view of an operating device of the operating system illustrated in FIG. 2.

As seen in FIG. 4, the operating device 14 includes an upshift switch 14U and a downshift switch 14D. The upshift switch 14U is configured to receive the user upshift input US2. The downshift switch 14D is configured to receive the user downshift input DS2. The downshift switch 14D is configured to receive the user downshift input DS1. The operating device 14 includes a base member 14A and an operating member 14B. The base member 14A is configured to be mounted to the handlebar B2. The operating member 14B is pivotally coupled to the base member 14A. The upshift switch 14U and the downshift switch 14D are attached to the operating member 14B. The operating device 14 is operatively coupled to the front brake BC5.

As seen in FIG. 1, the operating system 10 includes a master unit 16 and a power supply 18. The master unit 16 is attached to the vehicle body B. The power supply 18 is mounted on the master unit 16. The operating system 10 comprises a wireless communication device 20. The power supply 18 is electrically connected to the wireless communication device 20 to supply electricity to the wireless communication device 20. Examples of the power supply 22 include a battery. In this embodiment, the wireless communication device 20 is mounted to the master unit 16. However, the wireless communication device 20 can be provided at other locations. The wireless communication device 20 can be a separate unit from the master unit 16.

As seen in FIG. 2, the master unit 16 is electrically connected to the wireless communication device 20, the operating devices 12 and 14, the shift changing devices SD1 and SD2, and the power supply 18 with an electrical communication wiring CW. Examples of the power supply 18 include a battery. The power supply 18 is configured to supply electricity to the master unit 16, the wireless communication device 20, the operating devices 12 and 14, and the shift changing devices SD1 and SD2 through the electrical communication wiring CW. The electrical communication wiring CW includes at least one electric cable. The electrical communication wiring CW can include at least one junction.

Figure 5:
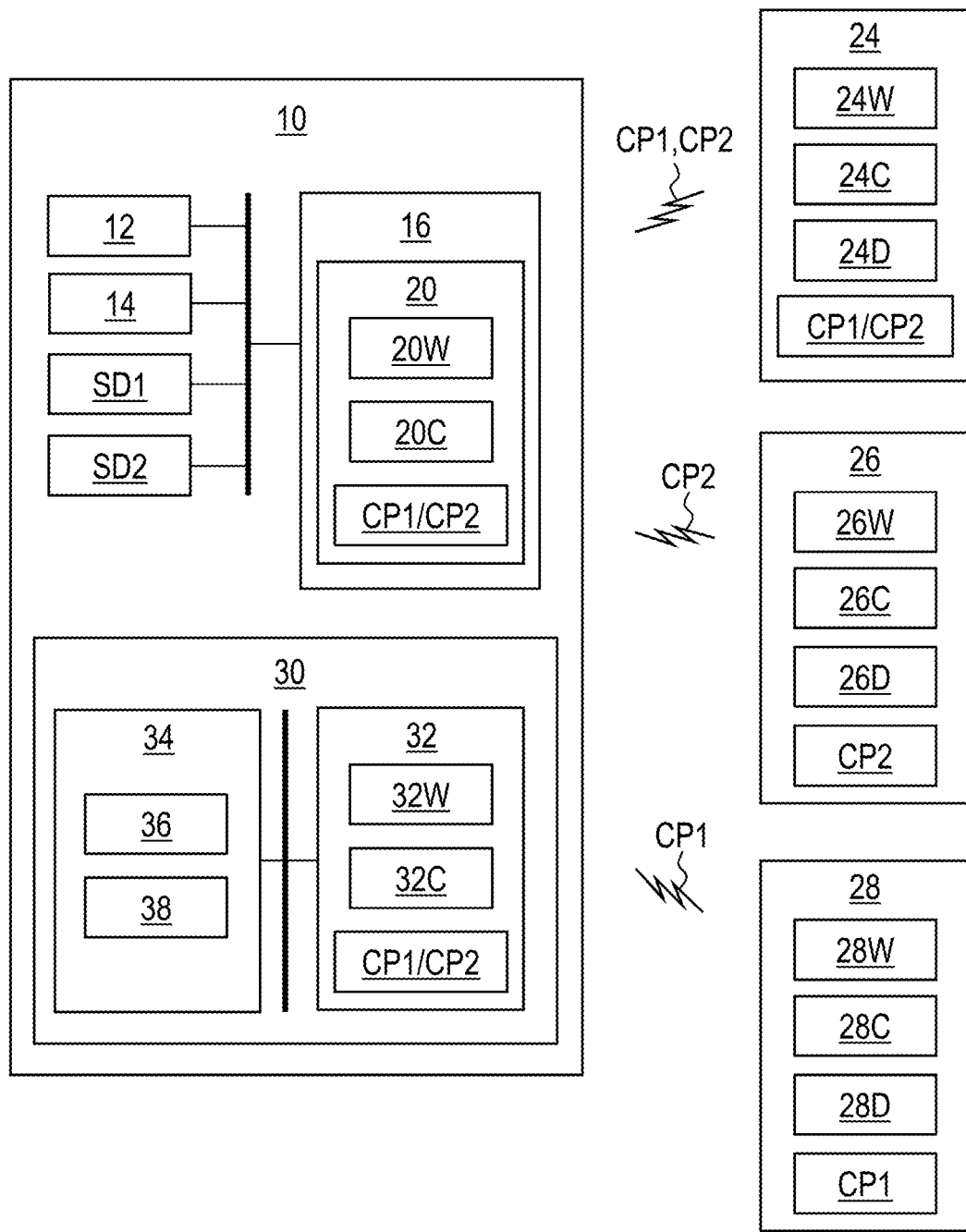
FIG. 5 is another schematic block diagram of the operating system of the human-powered vehicle illustrated in FIG. 1.

As seen in FIG. 5, the wireless communication device 20 is configured to wirelessly communicate with other electric devices such as an additional electric device 24, an additional electric device 26, or an additional electric device 28. Examples of the additional electric devices 24, 26, and 28 include a smartphone, a tablet computer, and a cycle computer. For example, the additional electric device 24 is a cycle computer, the additional electric device 26 is a smartphone, and the additional electric device 28 is another cycle computer. An application to control the operating system 10 is installed in the additional electric device 26. The user can input the setting of the operating system 10 using the application of the additional electric device 26. Each of the additional electric devices 24, 26, and 28 are configured to display information relating to the operating system 10.

In this embodiment, the additional electric device 24 is configured to wirelessly communicate with another device using a first communication protocol CP1 and a second communication protocol CP2. The second communication protocol CP2 is different from the first communication protocol CP1. Examples of the first communication protocol CP1 include ANT (trademark) and ANT+. Examples of the second communication protocol CP2 include Bluetooth (registered trademark). However, the first communication protocol CP1 can be other communication protocols. The second communication protocol CP2 can be other communication protocols different from the first communication protocol CP1.

In this embodiment, the additional electric device 26 is configured to wirelessly communicate with another device using only the second communication protocol CP2. The additional electric device 28 is configured to wirelessly communicate with another device using only the first communication protocol CP1. However, the additional electric devices 24, 26, and 28 are not limited to this embodiment.

As seen in FIG. 2, the wireless communication device 20 for the human-powered vehicle VH comprises a wireless communicator 20W and a controller 20C. The wireless communicator 20W is configured to wirelessly communicate with other wireless communicators such as an additional wireless communicator 24W of the additional electric device 24, an additional wireless communicator 26W of the additional electric device 26, and an additional wireless communicator 28W of the additional electric device 28. In this embodiment, the wireless communication device 20 is provided in the master unit 16. However, the wireless communication device 20 can be provided in another device.

In this embodiment, the wireless communication device 20 includes a circuit board 20B. The controller 20C includes a processor 20P and a memory 20M which are electrically mounted on the circuit board 20B. The processor 20P includes a central processing unit (CPU) and a memory controller. The memory 20M is connected to the processor 20P. The memory 20M includes a read only memory (ROM) and a random-access memory (RAM). The ROM includes a non-transitory computer-readable storage medium. The RAM includes a transitory computer-readable storage medium. The memory 20M includes storage areas each having an address in the ROM and the RAM. The processor 20P controls the memory 20M to store data in the storage areas of the memory 20M and reads data from the storage areas of the memory 20M. The memory 20M (e.g., the ROM) stores a program. The program is read into the processor 20P, and thereby algorithms of the wireless communication device 20.

The controller 20C is configured to store paired device information indicating a paired device which has been paired with the wireless communication device 20. In this embodiment, the memory 20M is configured to store the paired device information. The paired device includes the additional electric device 24. The wireless communication device 20 has a unique identifier that is assigned to the wireless communication device 20. The additional electric device 24 has a unique identifier that is assigned to the additional electric device 24. The paired device information includes the unique identifier of the additional electric device 24. The controller 20C stores the unique identifier of the additional electric device 24 in the memory 20M after pairing of the wireless communication device 20 and the additional electric device 24.

The wireless communicator 20W includes a signal generating circuit 20G, a signal transmitting circuit 20T, a signal receiving circuit 20R, and an antenna 20A. The signal generating circuit 20G generates wireless signals based on commands generated by the controller 20C. The signal generating circuit 20G superimposes digital signals on carrier wave using the first communication protocol CP1 or the second communication protocol CP2 to generate the wireless signals. The signal transmitting circuit 20T transmits the wireless signal via the antenna 20A in response to the commands generated by the controller 20C. In this embodiment, the signal generating circuit 20G can encrypt information to generate encrypted wireless signals. The signal generating circuit 20G encrypts digital signals stored in the memory 20M using a cryptographic key. The signal transmitting circuit 20T transmits the encrypted wireless signals. Thus, the wireless communication device 20 wirelessly transmits the wireless signal to establish wireless connection.

Further, the signal receiving circuit 20R receives wireless signals from the additional electric device 24 via the antenna 20A. In this embodiment, the signal receiving circuit 20R decodes the wireless signal to recognize information wirelessly transmitted from the additional electric device 24. The signal receiving circuit 20R may decrypt the encrypted wireless signal using the cryptographic key. Namely, the wireless communication device 20 is configured to transmit a wireless signal to control an additional electrical component and to receive a wireless signal to recognize information from the additional electrical component. In other words, the wireless communication device 20 is provided as a wireless transmitter and a wireless receiver. In this embodiment, the wireless communication device 20 is integrally provided as a single unit. However, the wireless communication device 20 can be constituted of a wireless transmitter and a wireless receiver which are provided as separate units arranged at different positions from each other. Furthermore, the wireless communicator 20W can includes a first wireless communicator and a second wireless communicator separately provided from the first wireless communicator. In such embodiment, the first wireless communicator is configured to use the first communication protocol CP1, and the second wireless communicator is configured to use the second communication protocol CP2.

As seen in FIG. 2, in this embodiment, the master unit 16, the operating devices 12 and 14, and the shift changing devices SD1 and SD2 can communicate with each other through a voltage line using power line communication technology. The power line communication technology is used for communicating between electrical components. Power line communication (PLC) carries data on a conductor that is also used simultaneously for electric power transmission or electric power distribution to the electrical component. In this embodiment, the electric power is supplied from the power supply 18 to the master unit 16 and the shift changing devices SD1 and SD2 through the electrical communication wiring CW. Furthermore, the master unit 16 and the shift changing devices SD1 and SD2 can receive information signals from each other through the electrical communication wiring CW using the PLC.

The PLC uses unique identifying information such as a unique identifier that is assigned to each of electrical components. Each of the operating devices 12 and 14, the shift changing devices SD1 and SD2, and the wireless communication device 20 is configured to store the unique identifying information. Based on the unique identifying information, each of the operating devices 12 and 14, the shift changing devices SD1 and SD2, and the wireless communication device 20 can recognize, based on the unique identifying information, information signals which are necessary for itself among information signals transmitted via the electrical communication wiring CW. For example, the operating devices 12 and 14, the shift changing devices SD1 and SD2, and the wireless communication device 20 can recognize information signals transmitted from the operating devices 12 and 14, the shift changing devices SD1 and SD2, and the wireless communication device 20 through the electrical communication wiring CW. Instead of using the PLC technology, however, separate signal wires can be provided for transmitting data in addition to the ground wire and the voltage wire if needed and/or desired.

The wireless communication device 20 comprises a PLC controller PC1. The PLC controller PC1 is electrically connected to the wireless communicator 20W. The PLC controller PC1 is connected to the electrical communication wiring CW. The PLC controller PC1 is configured to separate input signals to a power source voltage and control signals. The PLC controller PC1 is configured to regulate the power source voltage to a level at which the wireless communication device 20 can properly operate. The PLC controller PC1 is further configured to superimpose output signals on the power source voltage applied to the electrical communication wiring CW from the power supply 18.

The operating device 12 comprises a PLC controller PC2. The PLC controller PC2 is connected to the electrical communication wiring CW. The PLC controller PC2 is configured to separate input signals to a power source voltage and control signals. The PLC controller PC2 is configured to regulate the power source voltage to a level at which the shift changing device SD1 can properly operate. The PLC controller PC2 is further configured to superimpose output signals on the power source voltage applied to the electrical communication wiring CW from the power supply 18.

The operating device 14 comprises a PLC controller PC2. The PLC controller PC2 is connected to the electrical communication wiring CW. The PLC controller PC2 is configured to separate input signals to a power source voltage and control signals. The PLC controller PC2 is configured to regulate the power source voltage to a level at which the shift changing device SD1 can properly operate. The PLC controller PC2 is further configured to superimpose output signals on the power source voltage applied to the electrical communication wiring CW from the power supply 18.

The shift changing device SD1 comprises a PLC controller PC4. The PLC controller PC4 is connected to the electrical communication wiring CW. The PLC controller PC4 is configured to separate input signals to a power source voltage and control signals. The PLC controller PC4 is configured to regulate the power source voltage to a level at which the shift changing device SD1 can properly operate. The PLC controller PC4 is further configured to superimpose output signals on the power source voltage applied to the electrical communication wiring CW from the power supply 18.

The shift changing device SD1 comprises a PLC controller PC5. The PLC controller PC5 is connected to the electrical communication wiring CW. The PLC controller PC5 is configured to separate input signals to a power source voltage and control signals. The PLC controller PC5 is configured to regulate the power source voltage to a level at which the shift changing device SD1 can properly operate. The PLC controller PC5 is further configured to superimpose output signals on the power source voltage applied to the electrical communication wiring CW from the power supply 18.

As seen in FIG. 2, the operating device 12 includes a controller 12C. The controller 12C is electrically connected to the PLC controller PC2. In this embodiment, the controller 12C includes a processor 12P, a memory 12M, and a circuit board 12E. The processor 12P, the memory 12M, and the PLC controller PC2 are electrically mounted on the circuit board 12E and electrically connected to each other with the circuit board 12E. The processor 12P includes a central processing unit (CPU) and a memory controller. The memory 12M is connected to the processor 12P. The memory 12M includes a read only memory (ROM) and a random-access memory (RAM). The ROM includes a non-transitory computer-readable storage medium. The RAM includes a transitory computer-readable storage medium. The memory 12M includes storage areas each having an address in the ROM and the RAM. The processor 12P controls the memory 12M to store data in the storage areas of the memory 12M and reads data from the storage areas of the memory 12M. The memory 12M (e.g., the ROM) stores a program. The program is read into the processor 12P, and thereby algorithms of the operating device 12 are executed.

The controller 12C is configured to control the PLC controller PC2 to generate an upshift control signal UC1 in response to the user upshift input US1. The controller 12C is configured to control the PLC controller PC2 to generate a downshift control signal DC1 in response to the user downshift input DS1. The PLC controller PC2 is configured to superimpose the upshift control signal UC1 or the downshift control signal DC1 on the power source voltage applied to the electrical communication wiring CW from the power supply 18.

As seen in FIG. 2, the operating device 14 includes a controller 14C. The controller 14C is electrically connected to the PLC controller PC3. In this embodiment, the controller 14C includes a processor 14P, a memory 14M, and a circuit board 14E. The processor 14P, the memory 14M, and the PLC controller PC3 are electrically mounted on the circuit board 14E and electrically connected to each other with the circuit board 14E. The processor 14P includes a central processing unit (CPU) and a memory controller. The memory 14M is connected to the processor 14P. The memory 14M includes a read only memory (ROM) and a random-access memory (RAM). The ROM includes a non-transitory computer-readable storage medium. The RAM includes a transitory computer-readable storage medium. The memory 14M includes storage areas each having an address in the ROM and the RAM. The processor 14P controls the memory 14M to store data in the storage areas of the memory 14M and reads data from the storage areas of the memory 14M. The memory 14M (e.g., the ROM) stores a program. The program is read into the processor 14P, and thereby algorithms of the operating device 14 are executed.

The controller 14C is configured to control the PLC controller PC3 to generate an upshift control signal UC2 in response to the user upshift input US2. The controller 14C is configured to control the PLC controller PC3 to generate a downshift control signal DC2 in response to the user downshift input DS2. The PLC controller PC3 is configured to superimpose the upshift control signal UC2 or the downshift control signal DC2 on the power source voltage applied to the electrical communication wiring CW from the power supply 18.

The controller 20C of the wireless communication device 20 is configured to control the PLC controller PC1 to generate au upshift command UC11 in response to the upshift control signal UC1 transmitted from the operating device 12. The controller 20C of the wireless communication device 20 is configured to control the PLC controller PC1 to generate a downshift command DC11 in response to the downshift control signal DC transmitted from the operating device 12. The controller 20C of the wireless communication device 20 is configured to control the PLC controller PC1 to generate au upshift command UC21 in response to the upshift control signal UC2 transmitted from the operating device 14. The controller 20C of the wireless communication device 20 is configured to control the PLC controller PC1 to generate a downshift command DC21 in response to the downshift control signal DC2 transmitted from the operating device 14.

As seen in FIG. 2, the shift changing device SD1 includes a chain guide SD11, an motor SD12, a shift position sensor SD13, and a motor driver SD14. The motor SD12, the shift position sensor SD13, and the motor driver SD14 are connected to each other. The motor SD12 is mechanically coupled to the chain guide SD11. The motor SD12 is configured to move the chain guide SD11 to shift the chain C relative to the rear sprocket assembly BC2 (FIG. 1). In this embodiment, the motor SD12 includes a direct-current (DC) motor. The motor SD12 includes a rotational shaft (not shown) to output a rotational force. The rotational shaft is coupled to the chain guide SD11 via a gear reducer (not shown). Other examples of the motor SD12 include a stepper motor and an alternating-current (AC) motor.

The shift position sensor SD13 is configured to sense a position of the motor SD12 as the shift position of the shift changing device SD1. In this embodiment, the shift position sensor SD13 is a contact rotational position sensor such as a potentiometer. The shift position sensor SD13 is configured to sense an absolute rotational position of the rotational shaft of the motor SD12 as the shift position of the shift changing device SD1. Other examples of the shift position sensor SD13 include a non-contact rotational position sensor such as an optical sensor (e.g., a rotary encoder) and a magnetic sensor (e.g., a hall sensor).

The shift position sensor SD13 is electrically connected to the motor driver SD14. The motor driver SD14 is configured to control the motor SD12 based on the rear shift position sensed by the shift position sensor SD13. Specifically, the motor driver SD14 is electrically connected to the motor SD12. The motor driver SD14 is configured to control a rotational direction and a rotational speed of the rotational shaft based on the shift position and each of the upshift command UC11 and the downshift command DC11. Furthermore, the motor driver SD14 is configured to stop rotation of the rotational shaft to position the chain guide SD11 at one of the low to top gear positions based on the shift position and each of the upshift command UC11 and the downshift command DC11.

As seen in FIG. 2, the shift changing device SD2 includes a chain guide SD21, an motor SD22, a shift position sensor SD23, and a motor driver SD24. The motor SD22, the shift position sensor SD23, and the motor driver SD24 are connected to each other. The motor SD22 is mechanically coupled to the chain guide SD21. The motor SD22 is configured to move the chain guide SD21 to shift the chain C relative to the rear sprocket assembly BC2 (FIG. 1). In this embodiment, the motor SD22 includes a direct-current (DC) motor. The motor SD22 includes a rotational shaft (not shown) to output a rotational force. The rotational shaft is coupled to the chain guide SD21 via a gear reducer (not shown). Other examples of the motor SD22 include a stepper motor and an alternating-current (AC) motor.

The shift position sensor SD23 is configured to sense a position of the motor SD22 as the shift position of the shift changing device SD2. In this embodiment, the shift position sensor SD23 is a contact rotational position sensor such as a potentiometer. The shift position sensor SD23 is configured to sense an absolute rotational position of the rotational shaft of the motor SD22 as the shift position of the shift changing device SD2. Other examples of the shift position sensor SD23 include a non-contact rotational position sensor such as an optical sensor (e.g., a rotary encoder) and a magnetic sensor (e.g., a hall sensor).

The shift position sensor SD23 is electrically connected to the motor driver SD24. The motor driver SD24 is configured to control the motor SD22 based on the rear shift position sensed by the shift position sensor SD23. Specifically, the motor driver SD24 is electrically connected to the motor SD22. The motor driver SD24 is configured to control a rotational direction and a rotational speed of the rotational shaft based on the shift position and each of the upshift command UC21 and the downshift command DC21. Furthermore, the motor driver SD24 is configured to stop rotation of the rotational shaft to position the chain guide SD21 at one of the low to top gear positions based on the shift position and each of the upshift command UC21 and the downshift command DC21.

The controller 20C of the wireless communication device 20 is configured to receive the current shift position SP1 of the shift changing device SD1 from the shift position sensor SD13. The controller 20C of the wireless communication device 20 is configured to receive the current shift position SP2 of the shift changing device SD2 from the shift position sensor SD23. The controller 20C is configured to store the current shift positions SP1 and SP2 of the shift changing devices SD1 and SD2. The controller 20C is configured to control the wireless communicator 20W to generate wireless signals indicating the current shift positions SP1 and SP2 of the shift changing devices SD1 and SD2.

The additional electric device 24 includes a controller 24C and a display 24D. The controller 24C is electrically connected to the additional wireless communicator 24W and the display 24D. The controller 24C is configured to control the display 24D to display information relating to the operating system 10 transmitted from the wireless communicator 20W. The additional wireless communicator 24W and the controller 24C of the additional electric device 24 has substantially the same structures as the structures of the wireless communicator 20W and the controller 20C of the wireless communication device 20. Thus, it will not be described in detail here for the sake of brevity.

The additional electric device 26 includes a controller 26C and a display 26D. The controller 26C is electrically connected to the additional wireless communicator 26W and the display 26D. The controller 26C is configured to control the display 26D to display information relating to the operating system 10 transmitted from the wireless communicator 20W. The additional wireless communicator 26W and the controller 26C of the additional electric device 26 has substantially the same structures as the structures of the wireless communicator 20W and the controller 20C of the wireless communication device 20. Thus, it will not be described in detail here for the sake of brevity.

The additional electric device 28 includes a controller 28C and a display 28D. The controller 28C is electrically connected to the additional wireless communicator 28W and the display 28D. The controller 28C is configured to control the display 28D to display information relating to the operating system 10 transmitted from the wireless communicator 20W. The additional wireless communicator 28W and the controller 28C of the additional electric device 28 has substantially the same structures as the structures of the wireless communicator 20W and the controller 20C of the wireless communication device 20. Thus, it will not be described in detail here for the sake of brevity.

Figure 6:
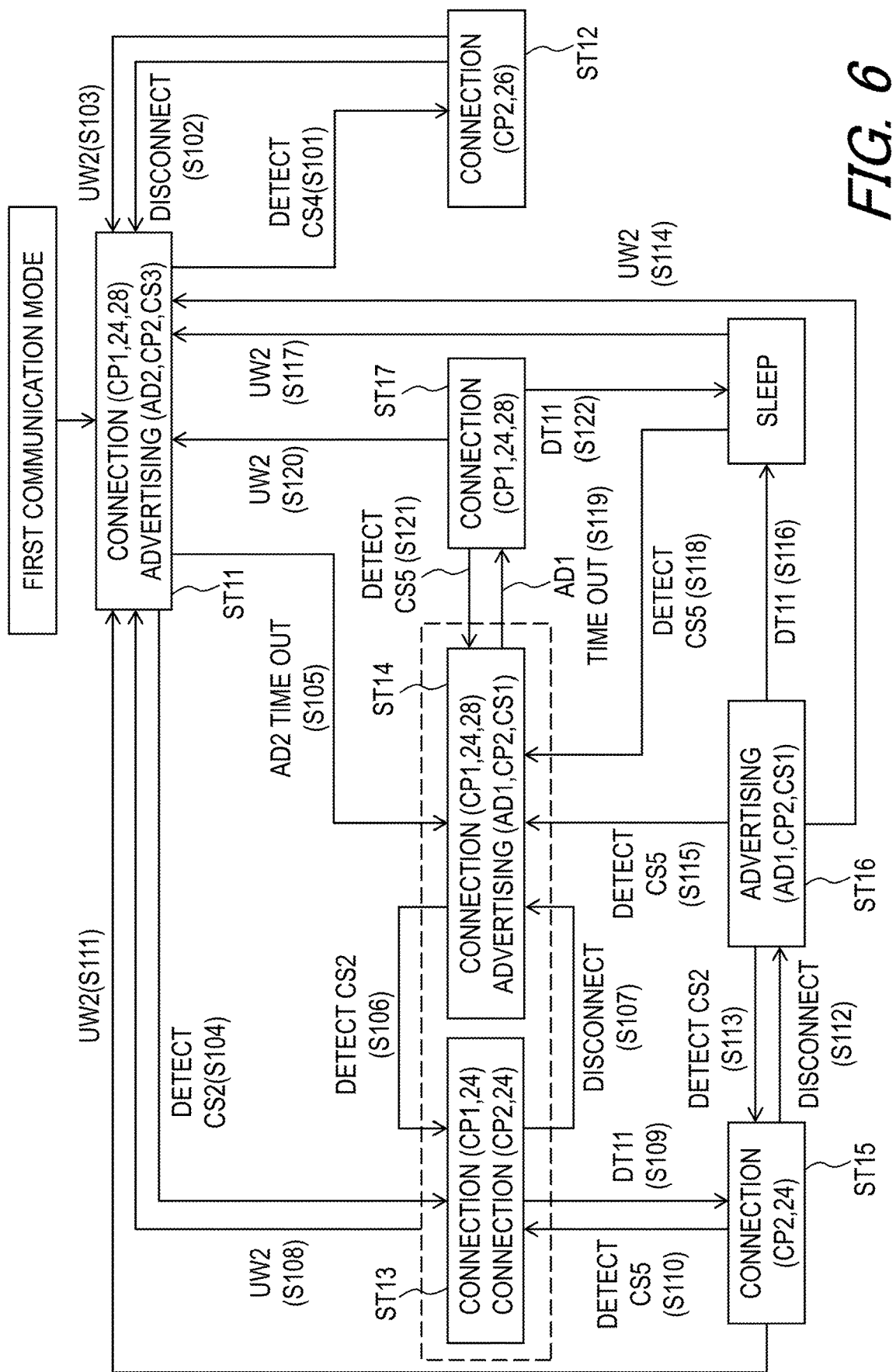
FIG. 6 is a flow chart of a first communication mode of the operating system illustrated in FIG. 2.
Figure 7:
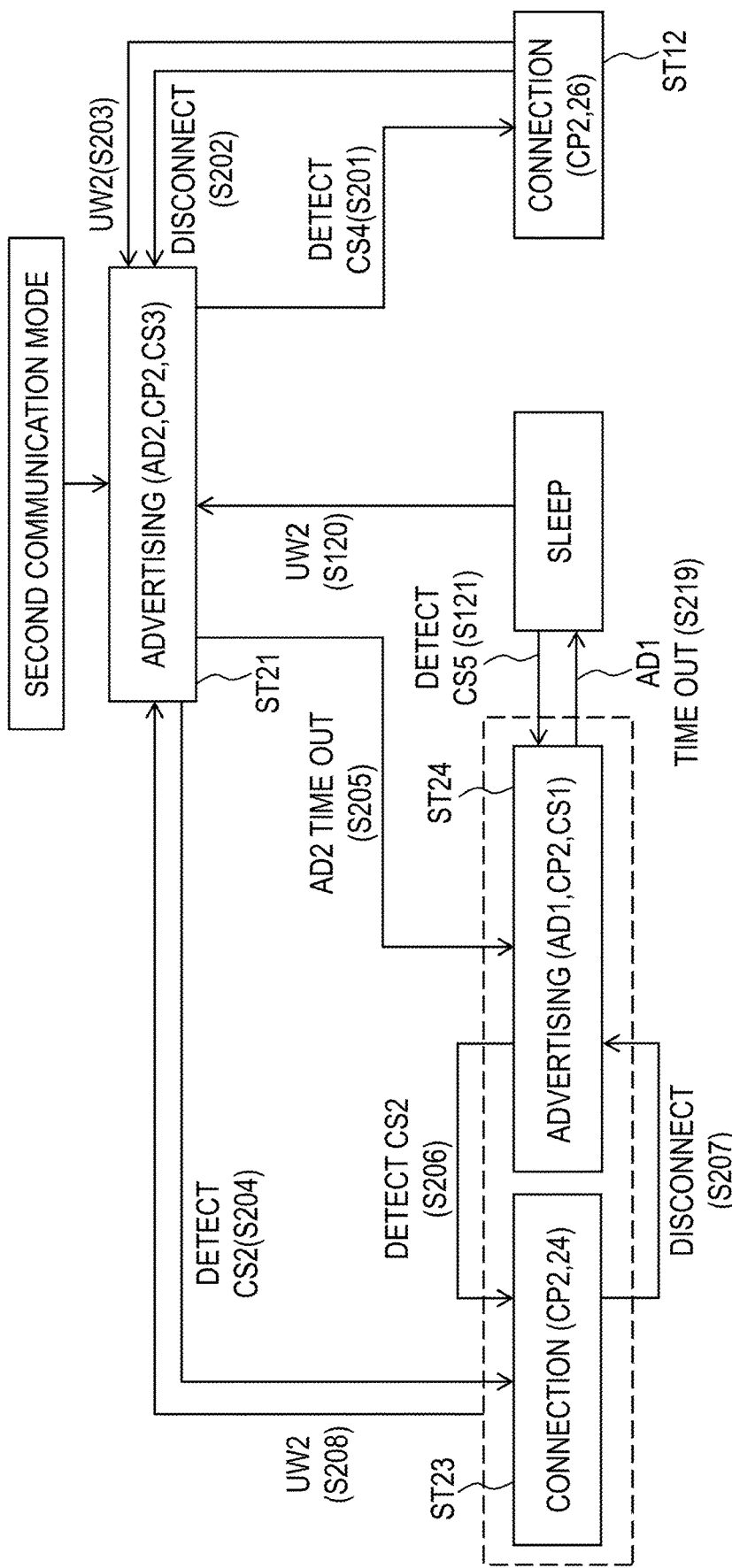
FIG. 7 is a flow chart of a second communication mode of the operating system illustrated in FIG. 2.

As seen in FIGS. 6 and 7, the wireless communicator 20W has a first communication mode using at least the first communication protocol CP1 and a second communication mode using the second communication protocol CP2 different from the first communication protocol CP1. The second communication mode is different from the first communication mode.

As seen in FIG. 6, in this embodiment, the wireless communicator 20W is configured to use each of the first communication protocol CP1 and the second communication protocol CP2 in the first communication mode. The wireless communicator 20W is configured to communicate with the additional wireless communicator 24W of the additional electric device 24 using the first communication protocol CP1 in the first communication mode after the wireless communicator 20W establishes the wireless connection between the wireless communicator 20W and the additional wireless communicator 24W. The wireless communicator 20W is configured to communicate with the additional wireless communicator 24W of the additional electric device 24 using the second communication protocol CP2 in the first communication mode after the wireless communicator 20W establishes wireless connection between the wireless communicator 20W and the additional wireless communicator 24W.

As seen in FIG. 7, the wireless communicator 20W is configured to use only the second communication protocol CP2 among the first communication protocol CP1 and the second communication protocol CP2 in the second communication mode.

Figure 8:
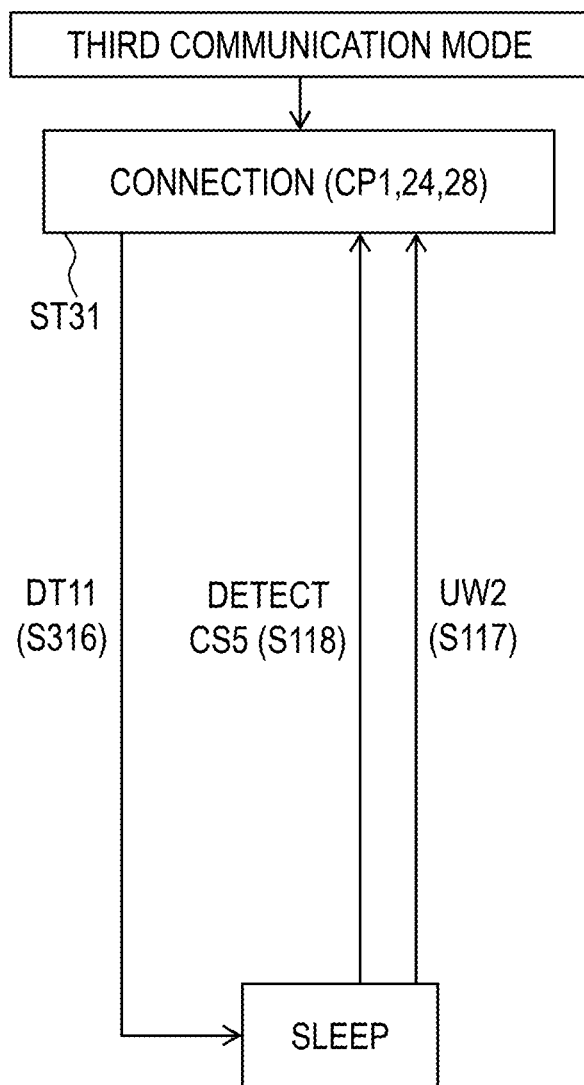
FIG. 8 is a flow chart of a third communication mode of the operating system illustrated in FIG. 2.

As seen in FIG. 8, in this embodiment, the wireless communicator 20W has a third communication mode using only the first communication protocol CP1 among the first communication protocol CP1 and the second communication protocol CP2. The third communication mode is different from the first communication mode and the second communication mode. The wireless communicator 20W is configured to communicate with the additional wireless communicator 24W of the additional electric device 24 using only the first communication protocol CP1 in the third communication mode. However, the third communication mode can be omitted from the wireless communicator 20W.

As seen in FIGS. 6 to 8, the controller 20C is configured to set the wireless communicator 20W with one of the first communication mode and the second communication mode. The controller 20C is configured to change a mode of the wireless communicator 20W from one of the first communication mode and the second communication mode to the other of the first communication mode and the second communication mode. In this embodiment, the controller 20C is configured to change the mode of the wireless communicator 20W from one of the first communication mode, the second communication mode, and the third communication mode to another of the first communication mode, the second communication mode, and the third communication mode. The controller 20C is configured to set the wireless communicator 20W with one of the first communication mode, the second communication mode, and the third communication mode.

The controller 20C is configured to change the mode of the wireless communicator 20W among the first communication mode, the second communication mode, and the third communication mode in a predetermined order. The controller 20C is configured to store the predetermined order in the memory 20M. In this embodiment, the controller 20C is configured to change the mode of the wireless communicator 20W from the first communication mode to the second communication mode. The controller 20C is configured to change the mode of the wireless communicator 20W from the second communication mode to the third communication mode. The controller 20C is configured to change the mode of the wireless communicator 20W from the third communication mode to the first communication mode. However, the order of changing the mode of the wireless communicator 20W is not limited to this embodiment. Another mode can be provided between the first and second communication modes, between the second and third communication modes, and/or between the third and first communication modes.

As seen in FIG. 2, in this embodiment, the wireless communication device 20 further comprises a mode switch 20S configured to receive a user input UW1. The controller 20C is configured to set the wireless communicator 20W with one of the first communication mode and the second communication mode based on the user input UW1. In this embodiment, the controller 20C is configured to set the wireless communicator 20W with one of the first communication mode and the second communication mode if the mode switch 20S receives the user input UW1. For example, the mode switch 20S includes a normally open switch. However, the structure of the mode switch 20S is not limited to the normally open switch. The controller 20C can be configured to automatically set the wireless communicator 20W with one of the first communication mode and the second communication mode based on information other than the user input UW1. For example, the controller 20C can be configured to automatically set the wireless communicator 20W with one of the first communication mode and the second communication mode based on information relating to battery charge remaining.

The controller 20C is configured to change the mode of the wireless communicator 20W among the first communication mode, the second communication mode, and the third communication mode in the predetermined order based on the user input UW1 received by the mode switch 20S. The controller 20C is configured to change the mode of the wireless communicator 20W from the first communication mode to the second communication mode if the mode switch 20S receives the user input UW1 in the first communication mode. The controller 20C is configured to change the mode of the wireless communicator 20W from the second communication mode to the third communication mode if the mode switch 20S receives the user input UW1 in the second communication mode. The controller 20C is configured to change the mode of the wireless communicator 20W from the third communication mode to the first communication mode if the mode switch 20S receives the user input UW1 in the third communication mode.

The mode switch 20S is configured to receive an additional user input UW2 different from the user input UW1. In this embodiment, examples of the user input UW1 include a short or usual press of the mode switch 20S. Examples of the additional user input UW2 include a long press of the mode switch 20S. However, the user input UW1 and the additional user input UW2 are not limited to this embodiment.

The wireless communication device 20 further comprises an indicator 20D configured to indicate the first communication mode and the second communication mode. In this embodiment, the indicator 20D is configured to differently indicate the first communication mode, the second communication mode, and the third communication mode. The controller 20C is configured to control the indicator 20D to indicate the first communication mode in a first manner if the wireless communicator 20W is in the first communication mode. The controller 20C is configured to control the indicator 20D to indicate the second communication mode in a second manner if the wireless communicator 20W is in the second communication mode. The controller 20C is configured to control the indicator 20D to indicate the third communication mode in a third manner if the wireless communicator 20W is in the second communication mode. The first manner, the second manner, and the third manner are different from each other.

In this embodiment, the indicator 20D includes a light emitting device including a light-emitting diode (LED). The indicator 20D is configured to emit each of first light having a first color and second light having a second color which is different from the first color. The first manner includes turning on the first light and the second light alternately. The second manner includes blinking the first light continuously twice and the second light blinks once. The third manner includes blinking the first light continuously three times and the second light blinks once. However, the first to third manners are not limited to this embodiment. The indicator 20D can be configured to emit light having a single color. The indicator 20D can have a plurality of LEDs. The indicator 20D can include a display to display information relating to the first to third communication modes.

The wireless communicator 20W has an awake state and a sleep state. In the awake state, the wireless communicator 20W is configured to wirelessly transmit a communication signal by selectively using at least one of the first communication protocol CP1 and the second communication protocol CP2 different from the first communication protocol CP1. In the sleep state, the wireless communicator 20W is configured to stop transmitting the communication signal. The controller 20C is configured to set the wireless communicator 20W with one of the awake state and the sleep state.

As seen in FIGS. 6 to 8, the wireless communicator 20W is configured to be in each of the first to third modes in a state where the wireless communicator 20W is in the awake state. The controller 20C is configured to store a current communication mode in the memory 20M. The controller 20C is configured to set the wireless communicator 20W with the current communication mode stored in the memory 20M if the controller 20C changes a state of the wireless communicator 20W from the sleep state to the awake state.

In the awake state, the wireless communicator 20W is configured to wirelessly transmit the communication signal by selectively using at least one of the first communication protocol CP1 and the second communication protocol CP2. The wireless communicator 20W runs on a first power consumption in the first communication mode. The wireless communicator 20W runs on a second power consumption in the second communication mode. The wireless communicator 20W runs on a third power consumption in the third communication mode. The second power consumption is lower than the first power consumption and the third power consumption. The third power consumption is lower than the first power consumption. The wireless communicator 20W runs on a sleep-state power consumption in the sleep state. The sleep-state power consumption is lower than the first, second, and third power consumptions.

Figure 9:
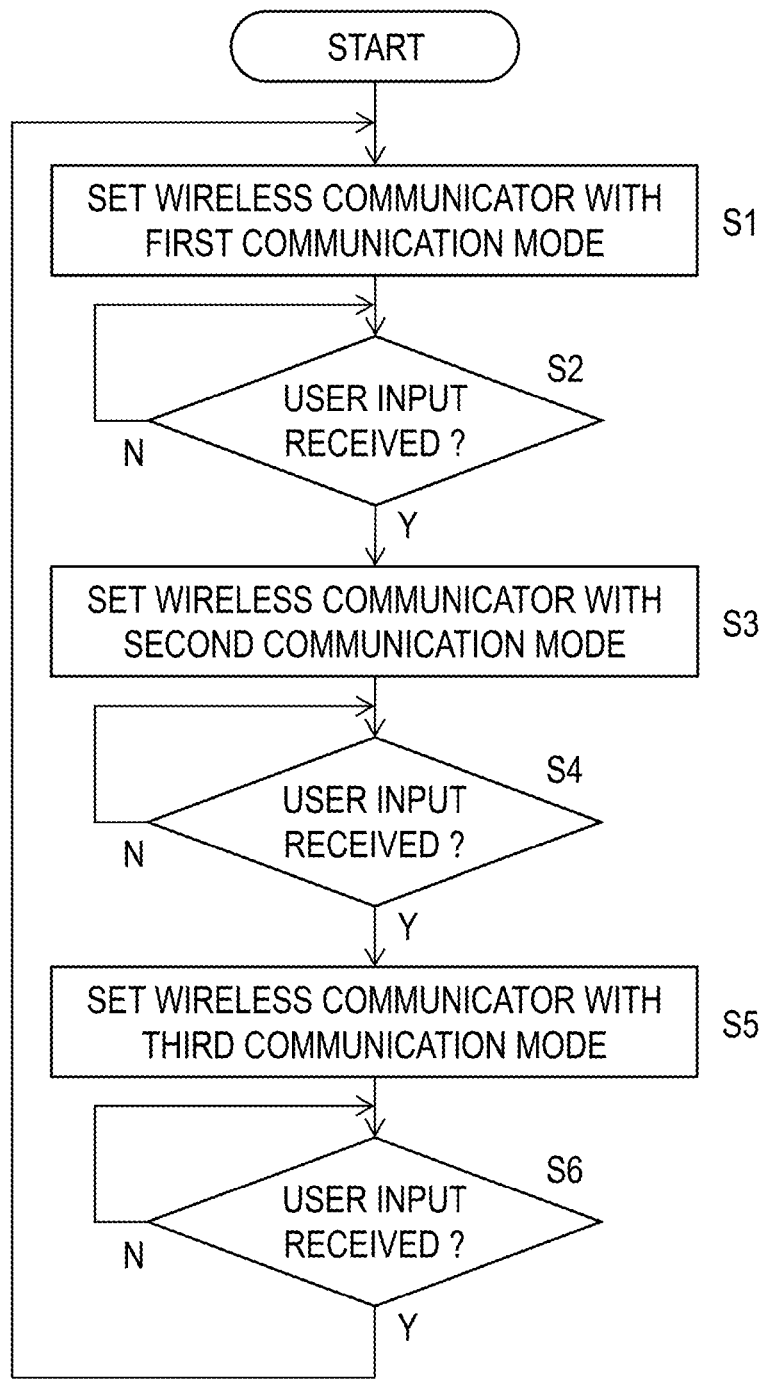
FIG. 9 is a flow chart of a mode switching operation of the operating system illustrated in FIG. 2.

As seen in FIG. 9, the controller 20C sets the wireless communicator 20W with the first communication mode if the wireless communication device 20 is turned on (Step S1). The controller 20C determines whether the mode switch 20S receives the user input UW1 in the first communication mode (Step S2). The controller 20C sets the wireless communicator 20W with the second communication mode if the mode switch 20S receives the user input UW1 in the first communication mode (Steps S2 and S3). The controller 20C determines whether the mode switch 20S receives the user input UW1 in the second communication mode (Step S4). The controller 20C sets the wireless communicator 20W with the third communication mode if the mode switch 20S receives the user input UW1 in the second communication mode (Steps S4 and S5). The controller 20C determines whether the mode switch 20S receives the user input UW1 in the third communication mode (Step S6). The process returns to Step S1 if the mode switch 20S receives the user input UW1 in the third communication mode (Step S6). Namely, the controller 20C sets the wireless communicator 20W with the first communication mode if the mode switch 20S receives the user input UW1 in the third communication mode (Steps S1 and S6).

Figure 10:
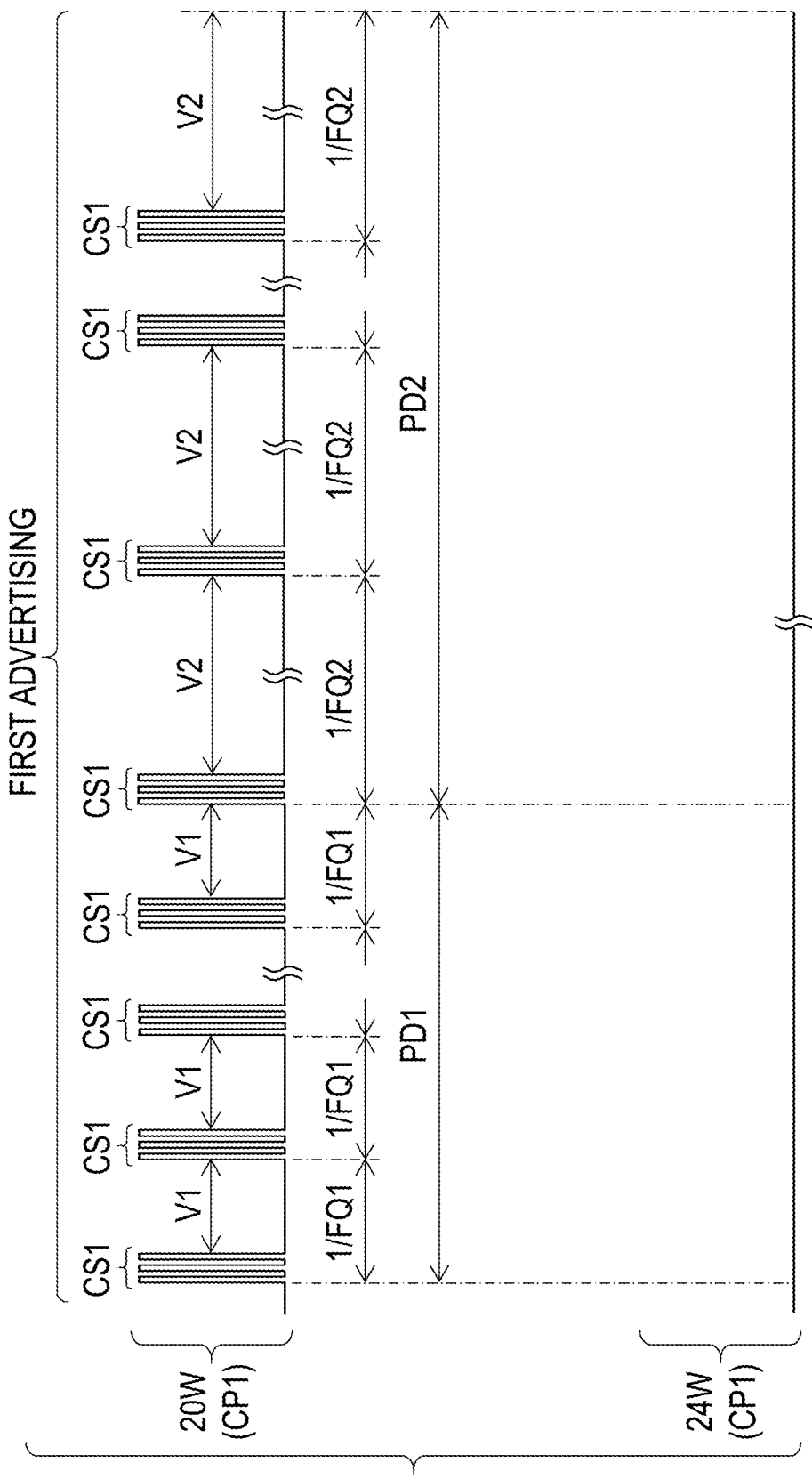
FIGS. 10 to 12 are timing charts of a first advertising of the operating system illustrated in FIG. 2.
Figure 11:
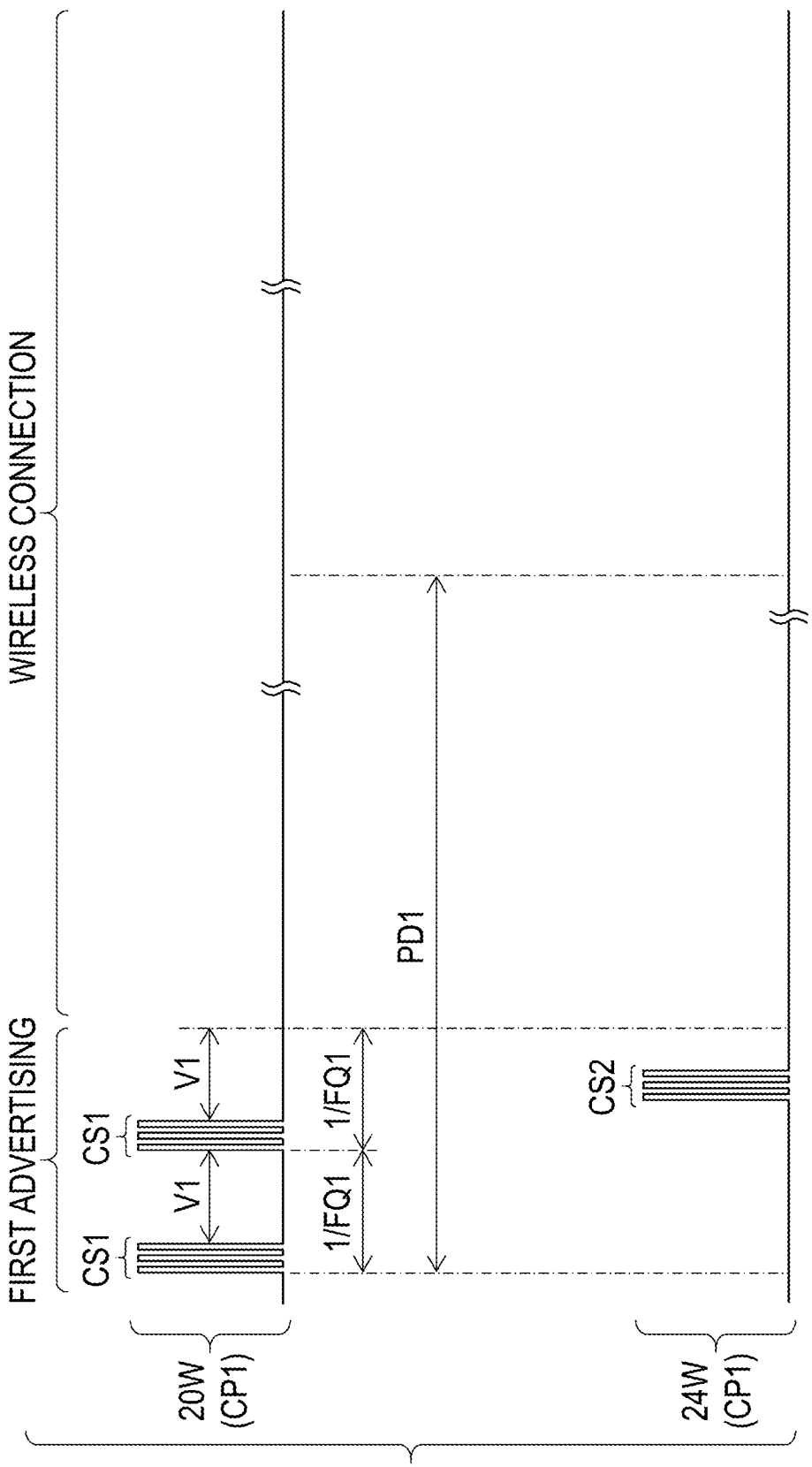
Figure 12:
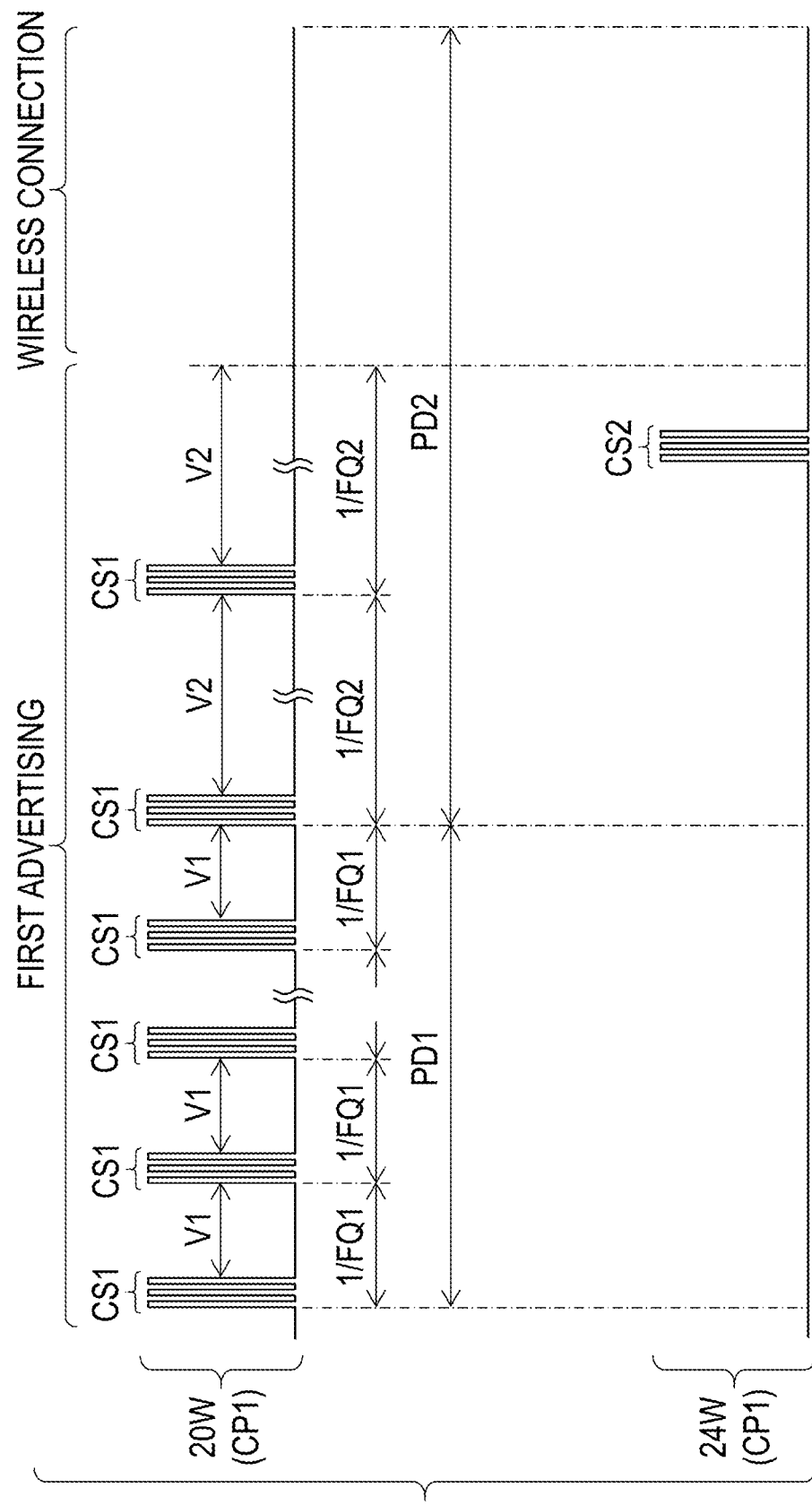

As seen in FIGS. 10 to 12, the controller 20C is configured to control the wireless communicator 20W to execute advertising based on the second communication protocol CP2. As seen in FIG. 10, in the first communication mode, the wireless communicator 20W has a first advertising and a second advertising different from the first advertising. In the first advertising and the second advertising, the wireless communicator 20W is configured to wirelessly transmit a connection demand signal CS1 to establish a wireless connection between the wireless communicator 20W and the additional wireless communicator 24W.

The additional wireless communicator 24W is configured to wirelessly transmit a connection signal CS2 to establish the wireless connection between the wireless communicator 20W and an additional wireless communicator 24W using the second communication protocol CP2. The controller 20C is configured to control the wireless communicator 20W to establish the wireless connection between the wireless communicator 20W and the additional wireless communicator 24W using the second communication protocol CP2 if the controller 20C detects the connection signal CS2.

In a case where the second communication protocol CP2 is Bluetooth or Bluetooth LE, for example, the connection demand signal CS1 includes an advertising packet having a format prescribed based on the second communication protocol CP2. The advertising packet includes a universal unique identifier (UUID) indicating a service of the wireless communication device 20. Namely, the wireless communication device 20 corresponds to a peripheral, and each of the additional electric devices 24, 26, and 28 corresponds to a central.

As seen in FIG. 10, in the first advertising, the controller 20C is configured to control the wireless communicator 20W to wirelessly transmit the connection demand signal CS1 at first frequency FQ1 for a first period PD1. The controller 20C is configured to control the wireless communicator 20W to wirelessly transmit the connection demand signal CS1 at second frequency FQ2 which is different from the first frequency FQ1 after a passage of the first period PD1. The controller 20C is configured to control the wireless communicator 20W to wirelessly transmit the connection demand signal CS1 at the second frequency FQ2 for the second period PD2 after the passage of the first period PD1.

In other words, the controller 20C is configured to control the wireless communicator 20W to wirelessly transmit the connection demand signal CS1 at first intervals V1 for the first period PD1. The controller 20C is configured to control the wireless communicator 20W to wirelessly transmit the connection demand signal CS1 at second intervals V2 which is different from the first intervals V1 after the passage of the first period PD1. The controller 20C is configured to control the wireless communicator 20W to wirelessly transmit the connection demand signal CS1 at the second intervals V2 for the second period PD2 after the passage of the first period PD1.

In this embodiment, the second frequency FQ2 is lower than the first frequency FQ1. The second interval is longer than the first interval. Examples of the first frequency FQ1 includes $1/100$ msec$^{-1}$. Examples of the second frequency FQ2 includes $1/500$ msec$^{-1}$. However, the first frequency FQ1 and the second frequency FQ2 are not limited to this embodiment. The second frequency FQ2 can be higher than the first frequency FQ1.

In this embodiment, the second period PD2 is different from the first period PD1. The second period PD2 is longer than the first period PD1. However, the second period PD2 can be equal to or shorter than the first period PD1.

As seen in FIG. 10, the controller 20C is configured to control the wireless communicator 20W to stop transmitting the connection demand signal CS1 after the passage of the second period PD2. In this embodiment, the controller 20C controls the wireless communicator 20W to stop transmitting the connection demand signal CS1 after the passage of the second period PD2 if the wireless communicator 20W does not detect the connection signal CS2 for the second period PD2.

As seen in FIG. 11, the controller 20C controls the wireless communicator 20W to stop transmitting the connection demand signal CS1 and to establish wireless connection between the wireless communicator 20W and the additional wireless communicator 24W if the wireless communicator 20W detects the connection signal CS2 before the passage of the first period PD1.

As seen in FIG. 12, the controller 20C controls the wireless communicator 20W to stop transmitting the connection demand signal CS1 and to establish wireless connection between the wireless communicator 20W and the additional wireless communicator 24W if the wireless communicator 20W detects the connection signal CS2 before the passage of the second period PD2.

Figure 13:
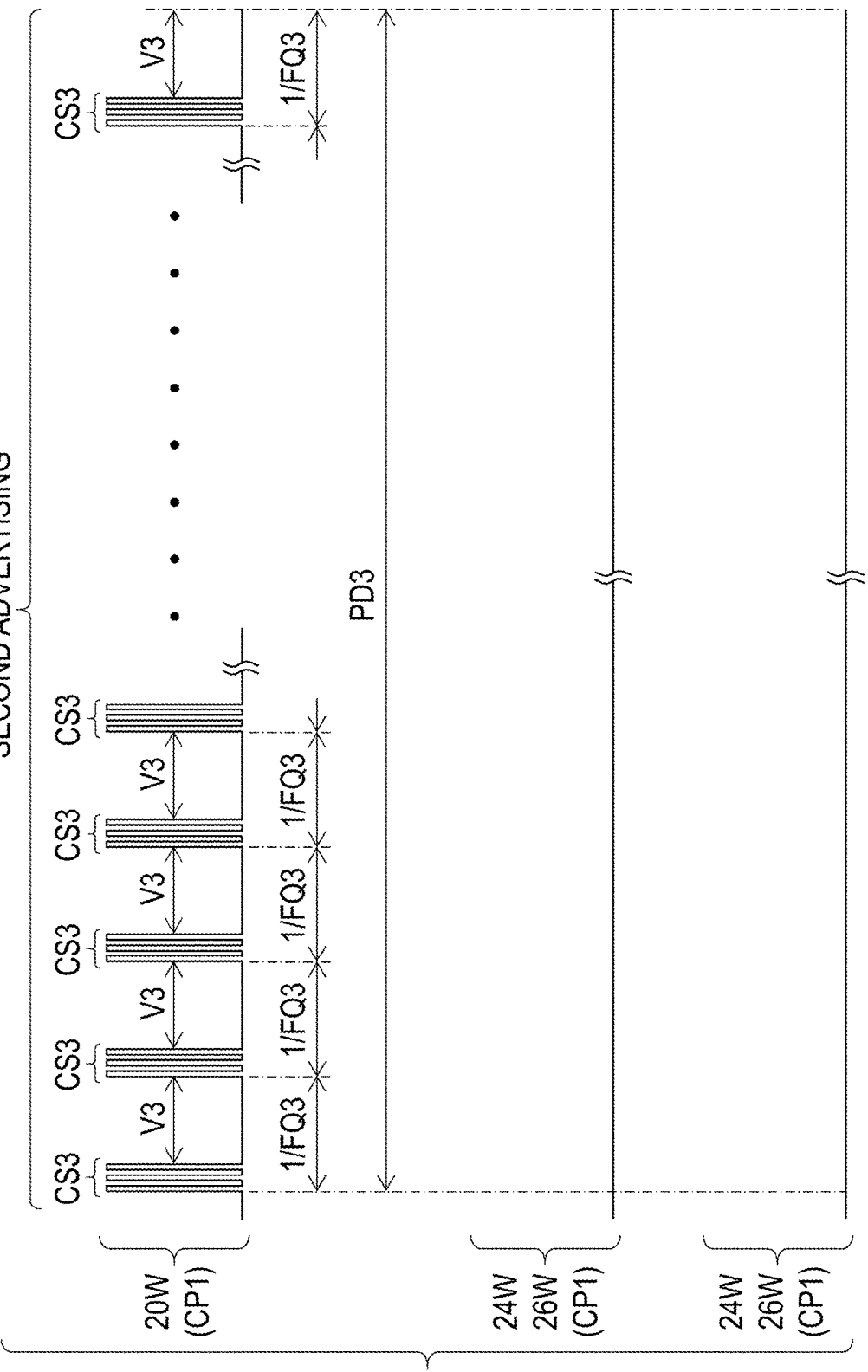
FIGS. 13 to 15 are timing charts of a second advertising of the operating system illustrated in FIG. 2.

As seen in FIG. 13, in the second advertising, the controller 20C is configured to control the wireless communicator 20W to wirelessly transmit a connection demand signal CS3 at third frequency FQ3 for a third period PD3. In the second advertising, the controller 20C is configured to control the wireless communicator 20W to wirelessly transmit the connection demand signal CS3 at third intervals V3 for the third period PD3.

In a case where the second communication protocol CP2 is Bluetooth or Bluetooth LE, for example, the connection demand signal CS3 includes an advertising packet having a format prescribed based on the second communication protocol CP2. The advertising packet includes a universal unique identifier (UUID) indicating a service of the wireless communication device 20. The connection demand signal CS3 is different from the connection demand signal CS1. The UUID of the advertising packet of the connection demand signal CS3 is different from the UUID of the advertising packet of the connection demand signal CS1. For example, the UUID of the advertising packet of the connection demand signal CS3 indicates a service for a cycle computer and an application of a smartphone or a tablet computer. The UUID of the advertising packet of the connection demand signal CS1 indicates another service for a cycle computer.

In this embodiment, the third frequency FQ3 is equal to the first frequency FQ1 and different from the second frequency FQ2. The third frequency FQ3 is higher than the first frequency FQ1. Examples of the third frequency FQ3 includes $1/100$ msec$^{-1}$. However, the third frequency FQ3 is not limited to this embodiment. The third frequency FQ3 can be different from the first frequency FQ1 and can be equal to or lower than the second frequency FQ2.

In this embodiment, the third period PD3 is equal to the first period PD1 and different from the second period PD2. The third period PD3 is shorter than the second period PD2. However, the third period PD3 can be equal to or longer than the second period PD2. The third period PD3 can be different from the first period PD1.

The controller 20C controls the wireless communicator 20W to stop transmitting the connection demand signal CS3 after the passage of the third period PD3 if the wireless communicator 20W does not detect both the connection signal CS2 and a connection signal CS4 for the third period PD3.

Figure 14:
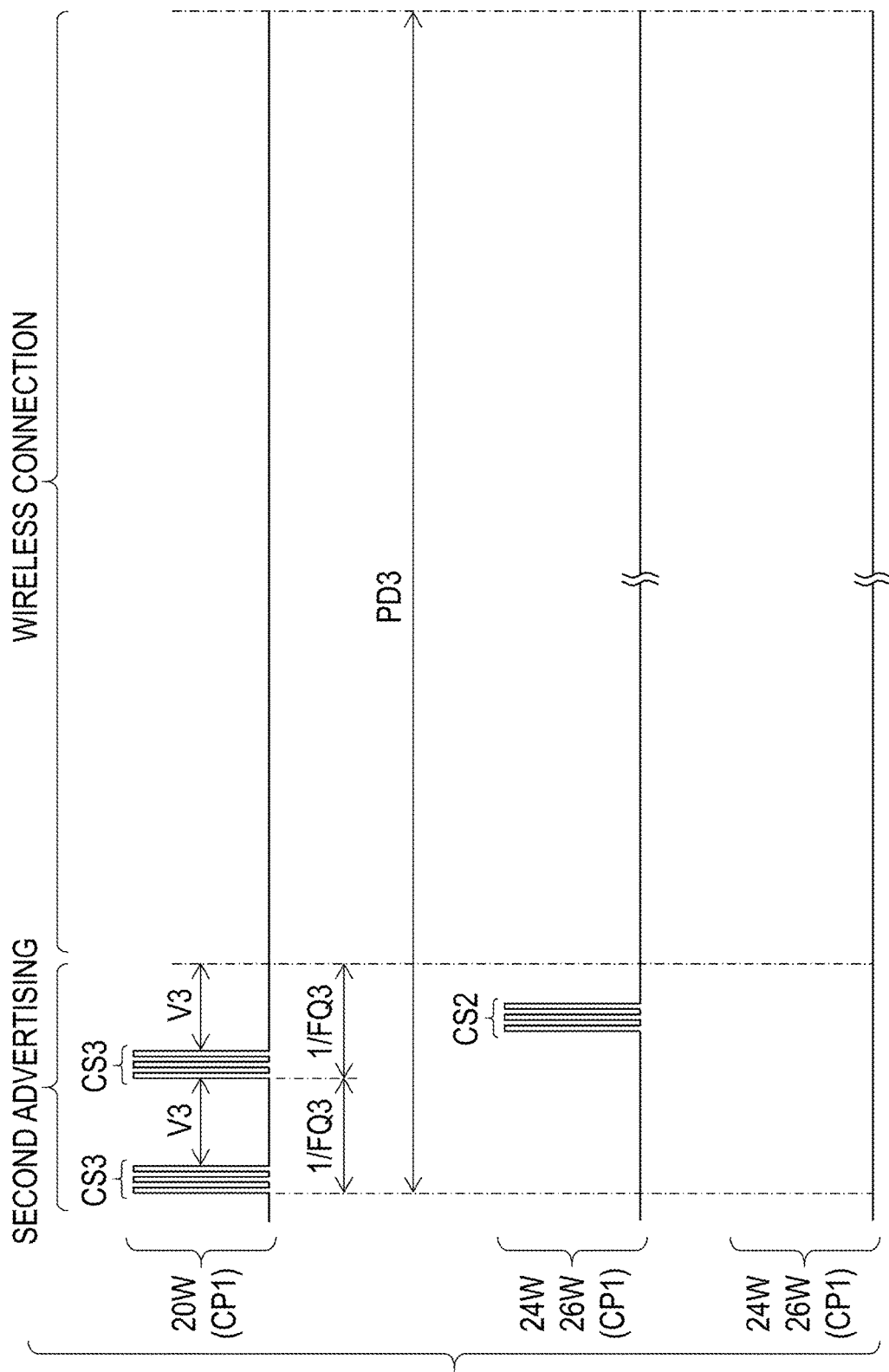
Figure 15:
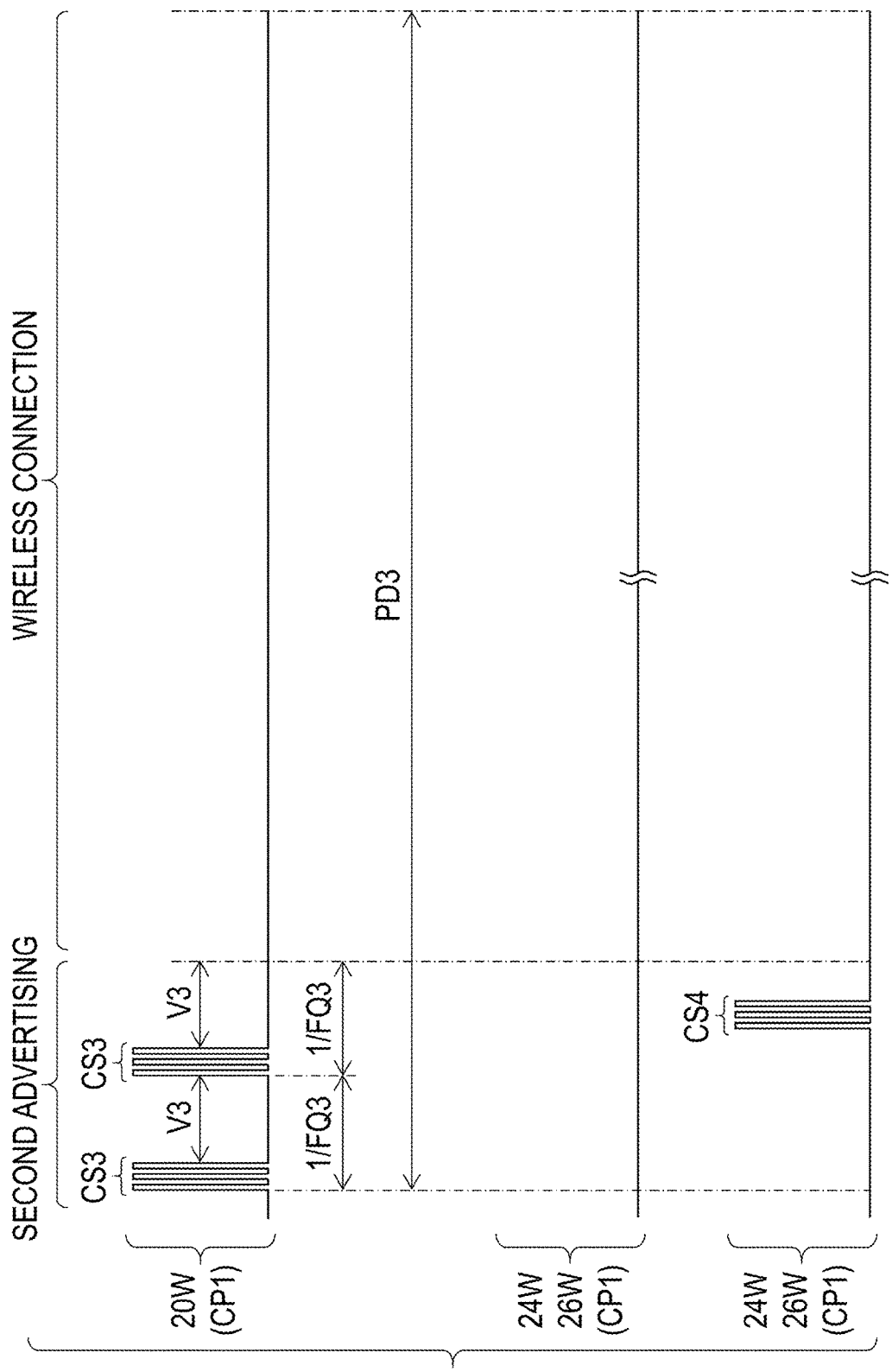

As seen in FIGS. 14 and 15, the controller 20C controls the wireless communicator 20W to stop transmitting the connection demand signal CS3 and to establish wireless connection between the wireless communicator 20W and the additional wireless communicator 24W if the wireless communicator 20W detects the connection signal CS2 or CS4 before the passage of the third period PD3.

As seen in FIG. 6, the controller 20C sets the wireless communicator 20W with an advertising state ST11 after the first communication mode starts. In the advertising state ST11, the controller 20C controls the wireless communicator 20W to wirelessly transmit information using the first communication protocol CP1 and controls the wireless communicator 20W to execute the second advertising AD2 (FIG. 13) using the second communication protocol CP2.

As seen in FIG. 5, in a case where the user uses the additional electric device 24, the controller 24C of the additional electric device 24 controls the display 24D to display the information wirelessly transmitted from the wireless communicator 20W using the first communication protocol CP1 if the additional wireless communicator 24W is in a mode in which the first communication protocol CP1 is used. In a case where the user uses the additional electric device 28, the controller 28C of the additional electric device 28 controls the display 28D to display the information wirelessly transmitted from the wireless communicator 20W using the first communication protocol CP1.

As seen in FIG. 6, in the second advertising AD2, the controller 20C controls the wireless communicator 20W to wirelessly transmit the connection demand signal CS3 for the third period PD3 (FIG. 13) using the second communication protocol CP2.

The additional wireless communicator 26W of the additional electric device 26 wirelessly transmits the connection signal CS4 if the additional wireless communicator 26W detects the connection demand signal CS3. The controller 20C sets the wireless communicator 20W with a second protocol connection state ST12 and stops transmitting the wireless signals using the first communication protocol CP1 if the wireless communicator 20W detects the connection signal CS4 during the third period PD3 (FIG. 15) (Step S101). In the second protocol connection state ST12, the wireless communicator 20W establishes the wireless connection between the wireless communicator 20W and the additional wireless communicator 26W using the second communication protocol CP2. In a case where the user uses the additional electric device 26, the controller 26C of the additional electric device 26 controls the display 26D to display the information wirelessly transmitted from the wireless communicator 20W using the second communication protocol CP2 in the second protocol connection state ST12.

As seen in FIG. 6, the controller 20C sets the wireless communicator 20W with the advertising state ST11 if the wireless connection established between the wireless communicator 20W and the additional wireless communicator 26W is disconnected (Step S102). Furthermore, the controller 20C sets the wireless communicator 20W with the advertising state ST11 if the mode switch 20S receives the additional user input UW2 (Step S103).

The additional wireless communicator 24W of the additional electric device 24 wirelessly transmits the connection signal CS2 if the additional wireless communicator 24W detects the connection demand signal CS1 in the second advertising AD2. The controller 20C sets the wireless communicator 20W a dual-communication state ST13 if the wireless communicator 20W detects the connection signal CS2 in the third period PD3 (FIG. 14) (Step S104). In the dual-communication state ST13, the wireless communicator 20W establishes the wireless connection between the wireless communicator 20W and the additional wireless communicator 24W using the second communication protocol CP2.

The controller 20C sets the wireless communicator 20W with an advertising state ST14 if the wireless communicator 20W does not receive the connection signals CS2 and CS4 for the third period PD3 (FIG. 13) (Step S105). In the advertising state ST14, the controller 20C controls the wireless communicator 20W to wirelessly transmit information using the first communication protocol CP1 and controls the wireless communicator 20W to execute the first advertising AD1 (FIG. 10) using the second communication protocol CP2.

The additional wireless communicator 24W of the additional electric device 24 wirelessly transmits the connection signal CS2 if the additional wireless communicator 24W detects the connection demand signal CS1 in the first advertising AD1. The controller 20C sets the wireless communicator 20W with the dual-communication state ST13 if the wireless communicator 20W detects the connection signal CS2 in the first period PD1 of the second period PD2 of the first advertising AD1 (FIG. 11 or 12) (Step S106).

The controller 20C sets the wireless communicator 20W with the advertising state ST14 if the wireless connection established between the wireless communicator 20W and the additional wireless communicator 24W is disconnected (Step S107). The controller 20C sets the wireless communicator 20W with the advertising state ST11 if the mode switch 20S receives the additional user input UW2 in the advertising state ST14 or the dual-communication state ST13 (Step S108).

The controller 20C sets the wireless communicator 20W with a second protocol connection state ST15 if a determination time DT11 elapses from a start of the dual-communication state ST13 (Step S109). The controller 20C sets the wireless communicator 20W with the dual-communication state ST13 if the controller 20C detects a determination signal CS5 in the second protocol connection state ST15 (Step S110). Examples of the determination signal CS5 include the upshift control signal UC1, the downshift control signal DC1, the upshift control signal UC2, and the downshift control signal DC2. Examples of the determination signal CS5 can include other signals. The controller 20C sets the wireless communicator 20W with the advertising state ST11 if the mode switch 20S receives the additional user input UW2 in the second protocol connection state ST15 (Step S111).

The controller 20C sets the wireless communicator 20W with an advertising state ST16 if the wireless connection established between the wireless communicator 20W and the additional wireless communicator 24W is disconnected (Step S112). In the advertising state ST16, the controller 20C controls the wireless communicator 20W to execute the first advertising AD1 (FIG. 10) using the second communication protocol CP2.

The controller 20C sets the wireless communicator 20W the second protocol connection state ST15 if the wireless communicator 20W detects the connection signal CS2 in the first period PD1 or the second period PD2 of the first advertising AD1 (FIG. 11 or 12) (Step S113). The controller 20C sets the wireless communicator 20W with the advertising state ST11 if the mode switch 20S receives the additional user input UW2 in the advertising state ST16 (Step S114).

The controller 20C sets the wireless communicator 20W with the advertising state ST14 if the controller 20C detects the determination signal CS5 in the advertising state ST16 (Step S115). After completion of the first advertising AD1, the controller 20C sets the wireless communicator 20W with the sleep state if the wireless communicator 20W does not receive, for a determination time DT11, the information wirelessly transmitted from the additional electric device 24 or 28 using the first communication protocol CP1 (Step S116).

The controller 20C sets the wireless communicator 20W with the advertising state ST11 if the mode switch 20S receives the additional user input UW2 in the sleep state (Step S117). The controller 20C sets the wireless communicator 20W with the advertising state ST14 if the controller 20C detects the determination signal CS5 in the sleep state (Step S118).

The controller 20C sets the wireless communicator 20W with a first protocol connection state ST17 after completion of the first advertising AD1 if the wireless communicator 20W does not detect the connection signal CS2 for the first period PD1 and the second period PD2 (FIG. 10) (Step S119). In a case where the user uses the additional electric device 24, the controller 24C of the additional electric device 24 controls the display 24D to display the information wirelessly transmitted from the wireless communicator 20W using the first communication protocol CP1 in the first protocol connection state ST17. In a case where the user uses the additional electric device 28, the controller 28C of the additional electric device 28 controls the display 28D to display the information wirelessly transmitted from the wireless communicator 20W using the first communication protocol CP1 in the first protocol connection state ST17.

The controller 20C sets the wireless communicator 20W with the advertising state ST11 if the mode switch 20S receives the additional user input UW2 in the first protocol connection state ST17 (Step S120). The controller 20C sets the wireless communicator 20W with the advertising state ST14 if the controller 20C detects the determination signal CS5 in the first protocol connection state ST17 (Step S121). The controller 20C sets the wireless communicator 20W with the sleep state if the wireless communicator 20W does not receive, for a determination time DT11, the information wirelessly transmitted from the additional electric device 24 or 28 using the first communication protocol CP1 (Step S122).

As seen in FIG. 7, the controller 20C sets the wireless communicator 20W with an advertising state ST21 after the second communication mode starts. In the advertising state ST21, the controller 20C controls the wireless communicator 20W to execute the second advertising AD2 (FIG. 13) using the second communication protocol CP2.

The controller 20C sets the wireless communicator 20W with the second protocol connection state ST12 if the wireless communicator 20W detects the connection signal CS4 during the third period PD3 (FIG. 15) (Step S201). The controller 20C sets the wireless communicator 20W with the advertising state ST21 if the wireless connection established between the wireless communicator 20W and the additional wireless communicator 26W is disconnected (Step S202). Furthermore, the controller 20C sets the wireless communicator 20W with the advertising state ST21 if the mode switch 20S receives the additional user input UW2 (Step S203).

The controller 20C sets the wireless communicator 20W a dual-communication state ST23 if the wireless communicator 20W detects the connection signal CS2 in the third period PD3 (FIG. 14) (Step S204). In the dual-communication state ST23, the wireless communicator 20W establishes the wireless connection between the wireless communicator 20W and the additional wireless communicator 24W using the second communication protocol CP2.

The controller 20C sets the wireless communicator 20W with an advertising state ST24 if the wireless communicator 20W does not receive the connection signal CS2 and CS4 for the third period PD3 (FIG. 13) (Step S205). In the advertising state ST24, the controller 20C controls the wireless communicator 20W to execute the first advertising AD1 (FIG. 10) using the second communication protocol CP2.

The controller 20C sets the wireless communicator 20W the dual-communication state ST23 if the wireless communicator 20W detects the connection signal CS2 in the first period PD1 of the second period PD2 of the first advertising AD1 (FIG. 11 or 12) (Step S206). In the dual-communication state ST23, the wireless communicator 20W establishes the wireless connection between the wireless communicator 20W and the additional wireless communicator 24W using the first communication protocol CP1 and the second communication protocol CP2.

The controller 20C sets the wireless communicator 20W with the advertising state ST24 if the wireless connection established between the wireless communicator 20W and the additional wireless communicator 24W is disconnected (Step S207). The controller 20C sets the wireless communicator 20W with the advertising state ST21 if the mode switch 20S receives the additional user input UW2 in the advertising state ST24 or the dual-communication state ST13 (Step S208).

The controller 20C sets the wireless communicator 20W with the sleep state after completion of the first advertising AD1 if the wireless communicator 20W does not detect the connection signal CS2 for the first period PD1 and the second period PD2 (FIG. 10) (Step S219). The controller 20C sets the wireless communicator 20W with the advertising state ST11 if the mode switch 20S receives the additional user input UW2 in the sleep state (Step S220). The controller 20C sets the wireless communicator 20W with the advertising state ST14 if the controller 20C detects the determination signal CS5 in the sleep state (Step S221).

As seen in FIG. 8, the controller 20C sets the wireless communicator 20W with a second protocol connection state ST31 after the third communication mode starts. The controller 20C sets the wireless communicator 20W with the sleep state if the wireless communicator 20W does not receive, for the determination time DT11, the information wirelessly transmitted from the additional electric device 24 or 28 using the first communication protocol CP1 (Step S316).

The controller 20C sets the wireless communicator 20W with the second protocol connection state ST31 if the mode switch 20S receives the additional user input UW2 in the sleep state (Step S317). The controller 20C sets the wireless communicator 20W with the second protocol connection state ST31 if the controller 20C detects the determination signal CS5 in the sleep state (Step S318).

As seen in FIG. 5, the operating system 10 comprises a pedaling sensing device 30. The pedaling sensing device 30 for the human-powered vehicle VH comprises a wireless communication device 32 and a pedaling sensor 34. The pedaling sensor 34 is configured to sense a state of pedaling. The wireless communication device 32 is configured to wirelessly transmit a pedaling signal indicating the state of the pedaling. In this embodiment, the pedaling sensor 34 is configured to sense a pedaling force applied to the crank BC1. The wireless communication device 32 is mounted to the crank arm BC13 of the crank BC1 and is electrically connected to the pedaling sensor 34. In this embodiment, the pedaling sensor 34 includes a first pedaling sensor 36 and a second pedaling sensor 38. The wireless communication device 32 is electrically connected to the first pedaling sensor 36 and the second pedaling sensor 38. However, the structure of the pedaling sensor 34 is not limited to this embodiment.

As seen in FIG. 16, the first pedaling sensor 36 includes a first strain gauge 36A, a first amplifier 36B, and a first analog-to-digital (A/D) converter 36C. The first strain gauge 36A is attached to the crank arm BC13 and is configured to sense strain occurring in the crank arm BC13 from a pedaling force. The first strain gauge 36A includes at least a strain gauge or a semiconductor sensor. The first amplifier 36B is configured to amplify an output of the first strain gauge 36A. The first A/D converter 36C is configured to convert analog signals output from the first amplifier 36B to digital signals.

The second pedaling sensor 38 includes a second strain gauge 38A, a second amplifier 38B, and a second analog-to-digital (A/D) converter 38C. The second strain gauge 38A is attached to the crank arm BC14 and is configured to sense strain occurring in the crank arm BC14 from a pedaling force. The second strain gauge 38A includes at least a strain gauge or a semiconductor sensor. The second amplifier 38B is configured to amplify an output of the second strain gauge 38A. The second A/D converter 38C is configured to convert analog signals output from the second amplifier 38B to digital signals.

As seen in FIG. 16, the pedaling sensing device 30 includes a sensing controller 40 and a cadence sensor 42. The sensing controller 40 is configured to control the first pedaling sensor 36 and the second pedaling sensor 38. The cadence sensor 42 includes a magnetism sensor such as a lead switch or a hall sensor which is configured to sense a magnet mounted on the vehicle frame B1 (FIG. 1). The sensing controller 40 includes a first power calculator 44 and a second power calculator 46. The first power calculator 44 is configured to calculate power based on the digital signals output from the first A/D converter 36C of the first pedaling sensor 36 and the cadence sensor 42. The second power calculator 46 is configured to calculate power based on the digital signals output from the second A/D converter 38C of the second pedaling sensor 38 and the cadence sensor 42.

The pedaling sensing device 30 includes a power supply 48. The power supply 48 is electrically connected to the pedaling sensor 34, the wireless communication device 32, the sensing controller, and the cadence sensor to supply electricity to the pedaling sensor 34, the wireless communication device 32, the sensing controller, and the cadence sensor. For example, the power supply 48 is provided in the crank axle BC15 (FIG. 1).

The wireless communication device 32 is configured to wirelessly communicate with other electric devices such as the additional electric device 24, the additional electric device 26, or the additional electric device 28. The wireless communication device 32 for the human-powered vehicle VH comprises a wireless communicator 32W and a controller 32C. The wireless communicator 32W is configured to wirelessly communicate with other wireless communicators such as the additional wireless communicator 24W of the additional electric device 24, the additional wireless communicator 26W of the additional electric device 26, and the additional wireless communicator 28W of the additional electric device 28.

In this embodiment, the wireless communication device 32 includes a circuit board 32B. The controller 32C includes a processor 32P and a memory 32M which are electrically mounted on the circuit board 32B. The wireless communicator 32W includes a signal generating circuit 32G, a signal transmitting circuit 32T, a signal receiving circuit 32R, and an antenna 32A.

In this embodiment, the wireless communication device 32 further comprises a mode switch 32S configured to receive a user input UW3. The mode switch 32S is configured to receive an additional user input UW4 different from the user input UW3. In this embodiment, examples of the user input UW3 include a short or usual press of the mode switch 32S. Examples of the additional user input UW4 include a long press of the mode switch 32S. However, the user input UW3 and the additional user input UW4 are not limited to this embodiment. The wireless communication device 32 further comprises an indicator 32D configured to indicate the first communication mode, the second communication mode, and the third communication mode.

In this embodiment, the wireless communicator 32W, the controller 32C, the mode switch 32S, and the indicator 32D have substantially the same structures as those of the wireless communicator 20W, the controller 20C, the mode switch 20S, and the indicator 20D. The circuit board 32B, the processor 32P, and the memory 32M have the same structures as those of the circuit board 20B, the processor 20P, and the memory 20M of the wireless communication device 20. The signal generating circuit 32G, the signal transmitting circuit 32T, the signal receiving circuit 32R, and the antenna 32A have substantially the same structures as those of the signal generating circuit 20G, the signal transmitting circuit 20T, the signal receiving circuit 20R, and the antenna 20A of the wireless communication device 20. The wireless communicator 32W has the first communication mode, the second communication mode, and the third communication mode. The wireless communicator 32W has substantially the same structure as that of the wireless communicator 20W of the wireless communication device 20. Thus, it will not be described in detail here for the sake of brevity.

Second Embodiment

An operating system 210 including a wireless communication device 220 in accordance with a second embodiment will be described below referring to FIGS. 17 and 18. The operating system 210 has the same structure and/or configuration as those of the operating system 10 except for the mode switch 20S. Thus, elements having substantially the same structure and/or configuration as those in the first embodiment will be numbered the same here and will not be described and/or illustrated again in detail here for the sake of brevity.

Figure 17:
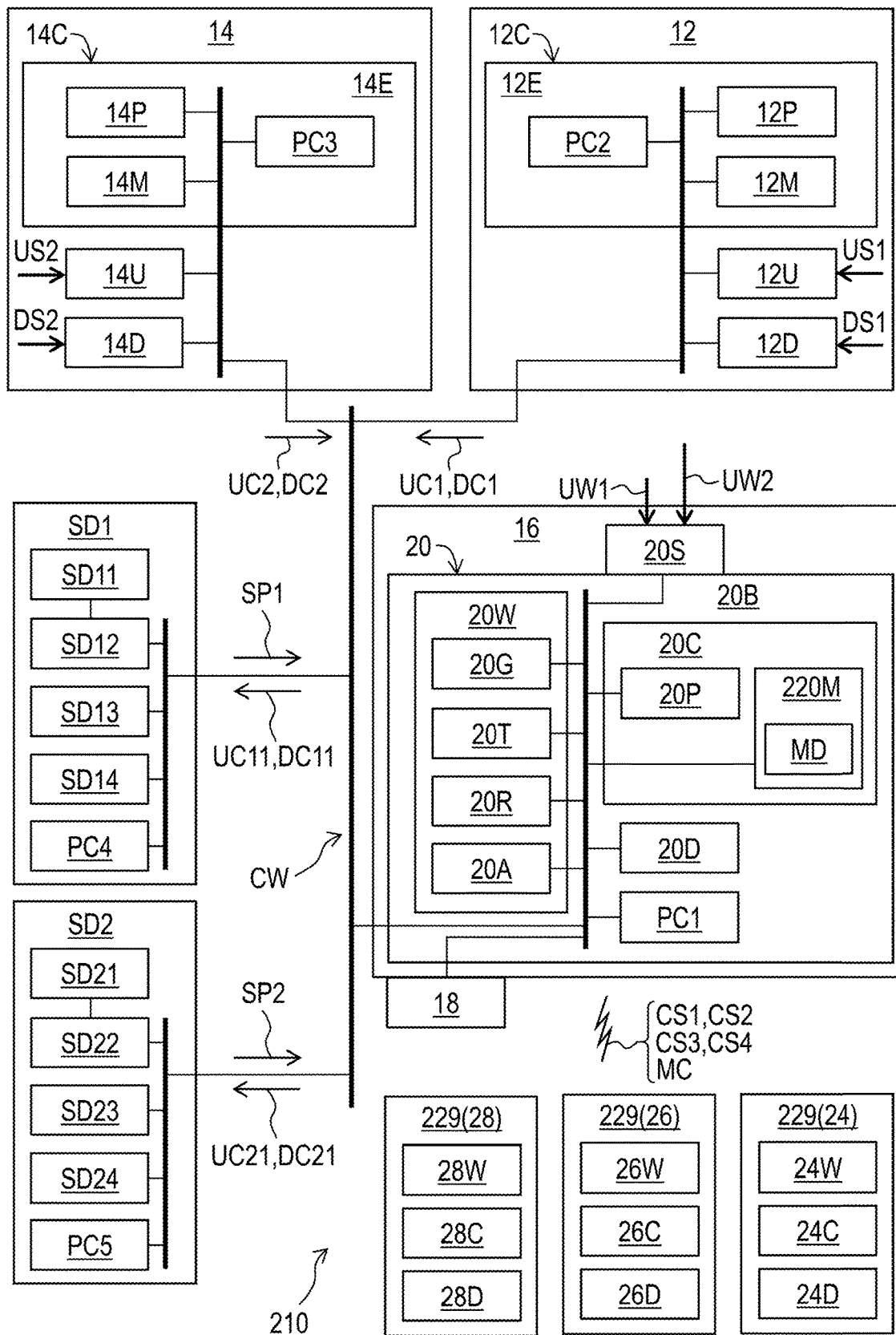
FIG. 17 is a schematic block diagram of an operating system including a wireless communication device in accordance with a second embodiment.

As seen in FIG. 17, in the wireless communication device 220, the controller 20C does not user the user input UW1 to set the communication mode of the wireless communicator 20W. In this embodiment, the controller 20C includes a memory 220M configured to store mode information MD indicating a selected communication mode. The controller 20C is configured to set the wireless communicator 20W with the selected communication mode based on the mode information MD. The selected communication mode includes one of the first communication mode and the second communication mode. In this embodiment, the selected communication mode includes one of the first communication mode CM1, the second communication mode CM2, and the third communication mode CM3.

The controller 20C is configured to receive a mode command MC indicating the selected communication mode from an input device 229. The controller 20C is configured to store the mode command MC as the mode information MD in the memory 220M if the controller 20C receives the mode command MC.

Examples of the input device 229 includes the additional electric devices 24, 26, and 28. Each of the additional electric devices 24, 26, and 28 wirelessly transmits the mode command MC indicating the selected communication mode to the wireless communicator 20W. Specifically, the user can select the communication mode among the first to third communication modes on the display 24D, 26D, or 28D. The additional electric devices 24, 26, or 28 wirelessly transmits the mode command MC indicating the communication mode selected using the additional electric devices 24, 26, or 28.

Figure 18:
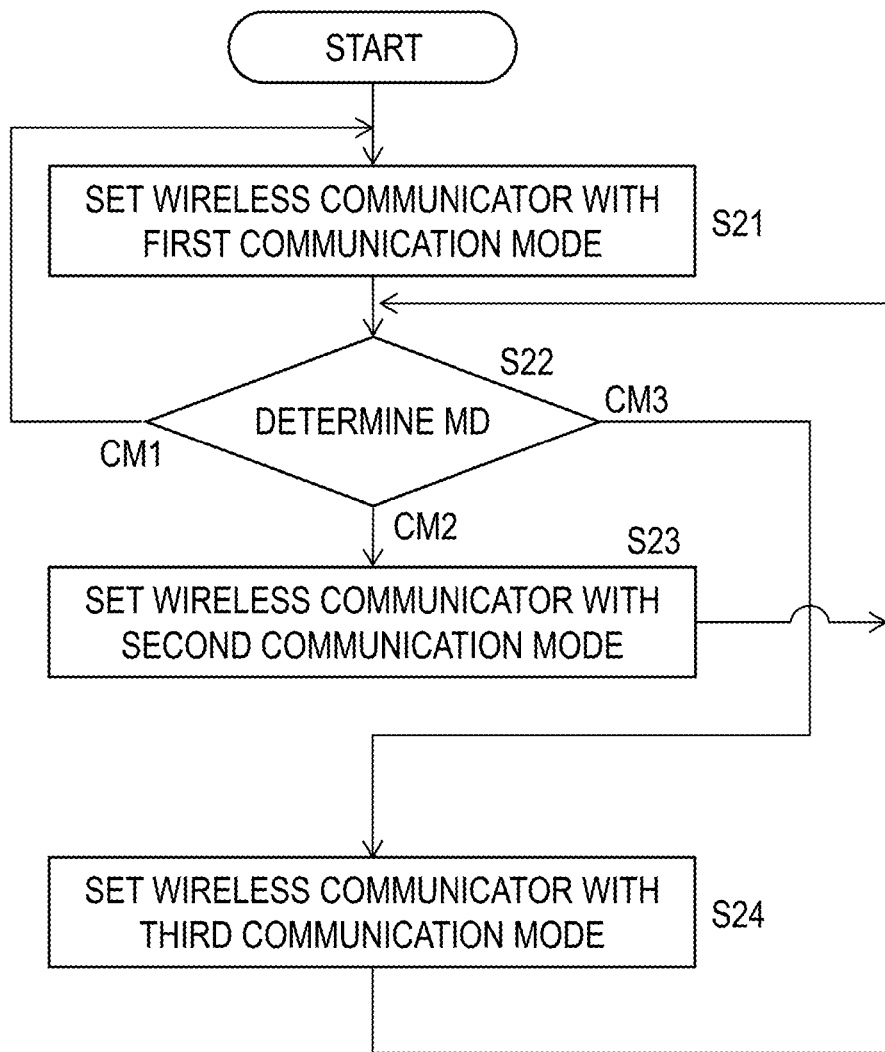
FIG. 18 is a flow chart of a mode switching operation of the operating system illustrated in FIG. 17.

As seen in FIG. 18, the controller 20C sets the wireless communicator 20W with the first communication mode CM1 (Step S21). The controller 20C determines the mode information MD (Step S22). The controller 20C sets the wireless communicator 20W with the first communication mode CM1 if the mode information MD indicates the first communication mode CM1 (Steps S21 and S22). The controller 20C sets the wireless communicator 20W with the second communication mode CM2 if the mode information MD indicates the second communication mode CM2 (Steps S21 and S23). The process returns to Step S22. The controller 20C sets the wireless communicator 20W with the third communication mode CM3 if the mode information MD indicates the third communication mode CM3 (Steps S21 and S24). The process returns to Step S22.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A wireless communication device for a human-powered vehicle, comprising:
    a wireless communicator having
        a first communication mode in which at least a first communication protocol is used, and
        a second communication mode in which a second communication protocol different from the first communication protocol is used; and
    a controller configured to set the wireless communicator with one of the first communication mode and the second communication mode, wherein
    the wireless communicator is configured to use each of the first communication protocol and the second communication protocol in the first communication mode.

2. The wireless communication device according to claim 1, wherein
    the controller is configured to change a mode of the wireless communicator from one of the first communication mode and the second communication mode to the other of the first communication mode and the second communication mode.

3. The wireless communication device according to claim 1, wherein
    the wireless communicator has a third communication mode in which only the first communication protocol among the first communication protocol and the second communication protocol is used.

4. The wireless communication device according to claim 1, wherein
    the controller is configured to change the mode of the wireless communicator from one of the first communication mode, the second communication mode, and the third communication mode to another of the first communication mode, the second communication mode, and the third communication mode.

5. The wireless communication device according to claim 1, wherein
    the controller is configured to change the mode of the wireless communicator among the first communication mode, the second communication mode, and the third communication mode in a predetermined order.

6. The wireless communication device according to claim 1, wherein
    the controller is configured to set the wireless communicator with one of the first communication mode and the second communication mode based on a user input.

7. The wireless communication device according to claim 6, further comprising
a mode switch configured to receive the user input.

8. The wireless communication device according to claim 1, wherein
the controller includes a memory configured to store mode information indicating a selected communication mode,
the controller is configured to set the wireless communicator with the selected communication mode based on the mode information, and
the selected communication mode includes one of the first communication mode and the second communication mode.

9. The wireless communication device according to claim 8, wherein
the controller is configured to receive a mode command indicating the selected communication mode from an input device, and
the controller is configured to store the mode command as the mode information in the memory if the controller receives the mode command.

10. The wireless communication device according to claim 1, further comprising
an indicator configured to indicate the first communication mode and the second communication mode.

11. The wireless communication device according to claim 10, wherein
the controller is configured to control the indicator to indicate the first communication mode in a first manner if the wireless communicator is in the first communication mode, and
the controller is configured to control the indicator to indicate the second communication mode in a second manner if the wireless communicator is in the second communication mode.

12. The wireless communication device according to claim 1, wherein
the wireless communicator has an awake state in which the wireless communicator is configured to wirelessly transmit the communication signal and a sleep state in which the wireless communicator is configured to stop transmitting the communication signal.

13. A wireless communication device for a human-powered vehicle, comprising:
a wireless communicator having
an awake state in which the wireless communicator is configured to wirelessly transmit a communication signal by selectively using at least one of a first communication protocol and a second communication protocol different from the first communication protocol, and
a sleep state in which the wireless communicator is configured to stop transmitting the communication signal; and
a controller configured to set the wireless communicator with one of the awake state and the sleep state, wherein
the wireless communicator is configured to use each of the first communication protocol and the second communication protocol in a first communication mode.

14. The wireless communication device according to claim 13, wherein
the wireless communicator has a second communication mode in which the second communication protocol different from the first communication protocol is used.

15. A pedaling sensing device for a human-powered vehicle, comprising:
a pedaling sensor configured to sense a state of pedaling; and
the wireless communication device according to claim 1, the wireless communication device being configured to wirelessly transmit a pedaling signal indicating the state of the pedaling.

* * * * *